US012293908B2

(12) United States Patent
Jarrold et al.

(10) Patent No.: US 12,293,908 B2
(45) Date of Patent: May 6, 2025

(54) MASS SPECTROMETER WITH CHARGE MEASUREMENT ARRANGEMENT

(71) Applicant: THE TRUSTEES OF INDIANA UNIVERSITY, Bloomington, IN (US)

(72) Inventors: Martin F. Jarrold, Bloomington, IN (US); David E. Clemmer, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 334 days.

(21) Appl. No.: 17/781,483

(22) PCT Filed: Dec. 16, 2020

(86) PCT No.: PCT/US2020/065301
§ 371 (c)(1),
(2) Date: Jun. 1, 2022

(87) PCT Pub. No.: WO2021/126972
PCT Pub. Date: Jun. 24, 2021

(65) Prior Publication Data

US 2023/0013173 A1 Jan. 19, 2023

Related U.S. Application Data

(60) Provisional application No. 62/949,554, filed on Dec. 18, 2019.

(51) Int. Cl.
*H01J 49/02* (2006.01)
*H01J 49/16* (2006.01)
(Continued)

(52) U.S. Cl.
CPC .......... *H01J 49/025* (2013.01); *H01J 49/027* (2013.01); *H01J 49/165* (2013.01); *H01J 49/40* (2013.01); *H01J 49/421* (2013.01); *H01J 49/422* (2013.01)

(58) Field of Classification Search
CPC ...... H01J 49/027; H01J 49/025; H01J 49/165; H01J 49/40; H01J 49/421; H01J 49/422
(Continued)

(56) References Cited

U.S. PATENT DOCUMENTS 3,019,168 A 1/1962 Taylor
5,285,063 A 2/1994 Schwartz et al.
(Continued)

FOREIGN PATENT DOCUMENTS

CN 102714127 A 10/2012
CN 107690690 A 2/2018
(Continued)

OTHER PUBLICATIONS

Japanese Office Action dispatched Jan. 18, 2023 for 2020-568469—16 pages (References 1, 2, 3 and 5 , and prior art document JP 2010-515210 English equivalent US 2013/327934A1,cited in this document have been previously submitted).
(Continued)

*Primary Examiner* — Kiet T Nguyen
(74) *Attorney, Agent, or Firm* — Barnes & Thornburg LLP

(57) ABSTRACT

A mass spectrometer may have an ion source region including an ion generator configured to generate ions from a sample, an ion detector configured to detect ions and produce corresponding ion detection signals, an electric field-free drift region disposed between the ion source region and the ion detector through which the generated ions drift axially toward the ion detector, a plurality of spaced-apart charge detection cylinders disposed in the drift region and through which the ions drifting axially through the drift region pass, and a plurality of charge amplifiers each coupled to a different one of the plurality of charge detection cylinders and each configured to produce a charge detection
(Continued)

signal corresponding to a magnitude of charge of one or more of the generated ions passing through a respective one of the plurality of charge detection cylinders.

20 Claims, 10 Drawing Sheets

(51) Int. Cl.
*H01J 49/40* (2006.01)
*H01J 49/42* (2006.01)
(58) Field of Classification Search
USPC .................................................. 250/287, 286
See application file for complete search history.

(56) References Cited

U.S. PATENT DOCUMENTS

| | | | |
|---|---|---|---|
| 5,478,745 | A | 12/1995 | Samulski |
| 5,572,025 | A | 11/1996 | Cotter |
| 5,770,857 | A | 6/1998 | Fuerstenau et al. |
| 5,863,541 | A | 1/1999 | Samulski et al. |
| 5,869,248 | A | 2/1999 | Yuan et al. |
| 5,877,022 | A | 3/1999 | Stinchcomb et al. |
| 5,880,466 | A | 3/1999 | Benner |
| 5,882,652 | A | 3/1999 | Valdes et al. |
| 5,886,346 | A | 3/1999 | Makarov |
| 5,905,040 | A | 5/1999 | Mazzara et al. |
| 5,916,563 | A | 6/1999 | Young et al. |
| 5,965,358 | A | 10/1999 | Carrion et al. |
| 6,013,487 | A | 1/2000 | Mitchell |
| 6,083,702 | A | 7/2000 | Mitchell et al. |
| 6,156,303 | A | 12/2000 | Russell et al. |
| 6,183,950 | B1 | 2/2001 | Madonna |
| 6,583,408 | B2 | 6/2003 | Smith et al. |
| 6,744,042 | B2 | 6/2004 | Zajfman et al. |
| 6,753,523 | B1 | 6/2004 | Whitehouse |
| 6,888,130 | B1 | 5/2005 | Gonin |
| 7,314,912 | B1 | 1/2008 | Hallek et al. |
| 7,829,842 | B2 | 11/2010 | Makarov |
| 8,294,085 | B2 | 10/2012 | Ding |
| 8,395,112 | B1 | 3/2013 | Bier |
| 8,409,870 | B2 | 4/2013 | Van Wujickhuijse |
| 8,766,170 | B2 | 7/2014 | Guna et al. |
| 8,866,074 | B2 | 10/2014 | Okumura |
| 8,963,075 | B2 | 2/2015 | Chen et al. |
| 9,095,793 | B2 | 8/2015 | Flagan |
| 10,056,244 | B1 | 8/2018 | Quarmby et al. |
| 10,088,451 | B2 | 10/2018 | Giles et al. |
| 2002/0185606 | A1 | 12/2002 | Smith et al. |
| 2003/0155502 | A1 | 8/2003 | Grosshans et al. |
| 2004/0169137 | A1 | 9/2004 | Westphall et al. |
| 2005/0236375 | A1 | 10/2005 | Gefter et al. |
| 2007/0102634 | A1 | 5/2007 | Frey et al. |
| 2007/0254352 | A1 | 11/2007 | Schaffer et al. |
| 2009/0020694 | A1 | 1/2009 | Florey |
| 2009/0078866 | A1 | 3/2009 | Li et al. |
| 2009/0108194 | A1 | 4/2009 | Page et al. |
| 2009/0189069 | A1 | 7/2009 | Chen |
| 2009/0294641 | A1 | 12/2009 | Konicek et al. |
| 2010/0084549 | A1 | 4/2010 | Ermakov et al. |
| 2010/0084552 | A1 | 4/2010 | Kawana |
| 2010/0090102 | A1 | 4/2010 | Rather et al. |
| 2010/0227310 | A1 | 9/2010 | Manalis et al. |
| 2010/0234837 | A1 | 9/2010 | Alfano |
| 2010/0314538 | A1 | 12/2010 | Makarov et al. |
| 2010/0320377 | A1 | 12/2010 | Cotter |
| 2011/0095175 | A1 | 4/2011 | Bateman |
| 2011/0240845 | A1 | 10/2011 | Ding |
| 2012/0112056 | A1 | 5/2012 | Brucker et al. |
| 2012/0282641 | A1 | 11/2012 | Reilly et al. |
| 2012/0292498 | A1 | 11/2012 | Jiang et al. |
| 2013/0068942 | A1 | 3/2013 | Verenchikov |
| 2013/0124099 | A1 | 5/2013 | Ecker et al. |
| 2013/0175440 | A1 | 7/2013 | Perelman et al. |
| 2013/0200261 | A1 | 8/2013 | Mizutani et al. |
| 2013/0234017 | A1 | 9/2013 | Kaltashov et al. |
| 2013/0327934 | A1 | 12/2013 | Makarov et al. |
| 2014/0197333 | A1 | 7/2014 | Jolliffe et al. |
| 2014/0299766 | A1 | 10/2014 | Anderson et al. |
| 2014/0346344 | A1 | 11/2014 | Chen |
| 2015/0008316 | A1 | 1/2015 | Guna |
| 2015/0021472 | A1 | 1/2015 | Makarov |
| 2015/0325425 | A1 | 11/2015 | Makarov |
| 2015/0331000 | A1 | 11/2015 | Collier et al. |
| 2016/0005580 | A1 | 1/2016 | Grinfeld |
| 2016/0035556 | A1 | 2/2016 | Berkout et al. |
| 2016/0181084 | A1 | 6/2016 | Smith |
| 2016/0336165 | A1 | 11/2016 | Guna |
| 2017/0040152 | A1 | 2/2017 | Makarov |
| 2017/0307565 | A1 | 10/2017 | Clemmer et al. |
| 2017/0372883 | A1 | 12/2017 | Verenchikov |
| 2018/0247805 | A1* | 8/2018 | Continetti .............. G01N 15/10 |
| 2019/0088459 | A1 | 3/2019 | Takahashi |
| 2019/0236142 | A1 | 8/2019 | Balakrishnan |
| 2020/0003739 | A1 | 1/2020 | Yamamoto et al. |
| 2020/0243317 | A1 | 7/2020 | Lopez-Hilfiker et al. |
| 2020/0357626 | A1 | 11/2020 | Jarrold et al. |

FOREIGN PATENT DOCUMENTS

| | | | |
|---|---|---|---|
| CN | 110506320 | A | 11/2019 |
| JP | 11144675 | | 5/1999 |
| JP | 2008186730 | A | 8/2008 |
| JP | 2011-507194 | A | 3/2011 |
| JP | 2011523172 | A | 8/2011 |
| JP | 2014501429 | A | 1/2014 |
| JP | 2014-122908 | A | 9/2014 |
| JP | 2014165053 | A | 9/2014 |
| JP | 2016522401 | A | 7/2016 |
| JP | 2019-056598 | A | 4/2019 |
| WO | 1998011244 | A1 | 3/1998 |
| WO | 1999061601 | A1 | 12/1999 |
| WO | 2000028004 | A1 | 5/2000 |
| WO | 2000028061 | A1 | 5/2000 |
| WO | 2001092551 | A2 | 5/2001 |
| WO | 2003042704 | A1 | 5/2003 |
| WO | 2006130474 | A2 | 12/2006 |
| WO | 2010135830 | A1 | 12/2010 |
| WO | 2012080352 | A1 | 6/2012 |
| WO | 2012083031 | A1 | 6/2012 |
| WO | 2012145037 | A1 | 10/2012 |
| WO | 2016073850 | A1 | 5/2016 |
| WO | 2017162779 | A1 | 9/2017 |
| WO | 2017190031 | A1 | 11/2017 |
| WO | 2018109895 | A1 | 6/2018 |
| WO | 2019118242 | A1 | 6/2019 |
| WO | 2019140233 | A1 | 7/2019 |
| WO | 2019162687 | A1 | 8/2019 |
| WO | 2019231854 | A1 | 12/2019 |
| WO | 2019236142 | A1 | 12/2019 |
| WO | 2019236143 | A1 | 12/2019 |
| WO | 2020117292 | A1 | 6/2020 |
| WO | 2020219527 | A1 | 10/2020 |

OTHER PUBLICATIONS

Japanese Office Action dispatched Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).

Paul et al., Das elektrische massenfilter als massenspektromeler und isotopenlrenner. Z. Phys. 152, 143-182 (1958).

Paul, et al., Das elektrische massenfiller, Z. Phys. 140, 262-273 (1955).

Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).

Pierson, Elizabeth E., et al. "Charge Detection Mass Spectrometry Identifies Preferred Non-icosahedral Polymorphs in the Self-

(56) References Cited

OTHER PUBLICATIONS

Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, May 2015.
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Shinholt, Deven L., et al., "A Frequency and Amplitude Scanned Quadrupole Mass Filter for the Analysis of High m/z Ions", Review of Scientific Instruments 85, 113109 (2014) (accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).
Syed, et al., Quadrupole mass filler: Design and performance for operation in stability zone 3. J. Am. Soc. Mass Spectrom. 24, 1493-1500 (2013).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Srivastava, Arun, et al., "Nucleotide Sequence and Organization of the Adena-Associated Virus 2 Genome", Journal of Virology, vol. 45, No. 2, pp. 555-564 (Feb. 1983).
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Walters, Robert W., "Structure of Adeno-Associated Virus Serotype 5", Journal of Virology, vol. 78, No. 7, pp. 3361-3371 (Apr. 2004).
Winger, Brian E., et al., "Observation and Implications of High Mass-to-Charge Ratio Ions from Electrospray Ionization Mass Spectrometry," 1993 American Society for Mass Spectrometry 4, 536-545.
Wang, Lei, et al., "Expanding the Genetic Code", Annual Review of Biophysics and Biomolecular Structure, vol. 35, pp. 25-249 (2006).
Weiss, Victor U., et al, "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiao, Weidong, et al., "Gene Therapy Vectors Based on Adena-Associated Virus Type 1", Journal of Virology, vol. 73, No. 5, pp. 3994-4003 (May 1999).
Uetrecht et al., "Stability and Shape of Hepatitis B Virus Capsids in Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Xiong, et al., The development of charge detection-quadrupole ion trap mass spectrometry driven by rectangular and riangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
Japanese Office Action dispatched Feb. 17, 2023 for application 2020-568389—11 pages.
European Office Action issued Mar. 3, 2023 for application 19732193. 8—14 pages.
Chiorini, John A., et al. "Cloning of Adeno-Associated Virus Type 4 (MV4) and Generation of Recombinant MV4 Particles",Journal of Virology, vol. 71, pp. 6823-6833 (Sep. 1997).
Chiorini, John A., "Cloning and Characterization of Adeno-Associated Virus Type 5", Journal of Virology, vol. 73, DP-1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Contino, Nathan Colby, "Ion trap charge detection mass spectrometry: Lowering limits of detection and improving signal to noise", ISBN: 9781303535048, Jul. 30, 2013 (Jul. 30, 2013).
Ding, et al., A simulation study of the digital ion trap mass spectrometer. Int. J. Mass Spectrom. 221, 117-138 (2002).
Ding, et al., A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., et al. "The Funpet—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.

(56) References Cited

OTHER PUBLICATIONS

Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Elliott, Andrew G., et al. "Effects of Individual Ion Energies on Charge Measurements in Fourier Transform Charge Detection Mass Spectrometry (FT-CDMS)", Journal of the American Society for Mass Spectrometry.,Nov. 14, 2018 (Nov. 14, 2018).
Fuerstenau, et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human Gene Therap", .; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in an Electrostatic Multireflection Ion Trap", European Journal of Mass Spectrometry,vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David et al., "Charge Detection Mass Spectrometry of Bacteriophage P22 Procapsid Distributions Above 20MDa", Rapid Communications in Mass Spectrometry, vol. 28, No. 5 , 2014.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied o digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1,No. 18,pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Nie et al., Frequency scan of a quadrupole mass analyzer in the third stability region for protein analysis. J. Chin. Chem_ Soc., 53, 47-52 (2006).
Padron, Eric, et al. "Structure of Adeno-Associated Virus Type 4", Journal of Virology, vol. 79, No. 8, pp. 5047-5058 Apr. 2005).
Puttaraju, M., et al. "Spliceosome-mediated RNA trans-splicing as a tool for gene therapy", Nature Biotechnology, vol. 17, pp. 246-252 (Mar. 1999).
Kosaka, Nobuyoshi, et al., "Versatile roles of extracellular vesicles in cancer," J Clin Invest. 2016;126(4):1163-1172. https://doi.org/10.1172/JCl81130.
PCT International Search Report and Written Opinion completed by the ISA/US on Oct. 11, 2021 and issued in connection with PCT/US2021/034480.
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.
Kiss et al. "Size, weight and position: ion mobility spectrometry and imaging MS combined", Anal Bioanal Chem. 2011. 399: pp. 2623-2634, especially: p. 2626, col. 1, para 1.
PCT International Search Report and Written Opinion completed by the ISA/US on Jan. 12, 2016 and issued in connection with PCT/US2015/059463.
PCT International Search Report and Written Opinion completed by the ISA/US on Jun. 19, 2017 and issued in connection with PCT/US2017/030163.
PCT International Search Report and Written Opinion completed by the ISA/EP on Feb. 14, 2019 and issued in connection with PCT/US2018/051944.
PCT International Search Report and Written Opinion completed by the ISA/EP on Apr. 18, 2019 and issued in connection with PCT/US2019/013251.
PCT International Search Report and Written Opinion completed by the ISA/EP on Apr. 16, 2019 and issued in connection with PCT/US2019/013274.
PCT International Search Report and Written Opinion completed by the ISA/EP on Mar. 27, 2019 and issued in connection with PCT/US2019/013277.
PCT International Search Report and Written Opinion completed by the ISA/EP on Jul. 24, 2019 and issued in connection with PCT/US2019/013278.
PCT International Search Report and Written Opinion completed by the ISA/EP on Sep. 9, 2019 and issued in connection with PCT/US2019/013279.

(56) References Cited

OTHER PUBLICATIONS

PCT International Search Report and Written Opinion completed by the ISA/EP on Mar. 28, 2019 and issued in connection with PCT/US2019/013280.
PCT International Search Report and Written Opinion completed by the ISA/EP on Aug. 27, 2019 and issued in connection with PCT/US2019/013281.
PCT International Search Report and Written Opinion completed by the ISA/EP on Mar. 27, 2019 and issued in connection with PCT/US2019/013283.
PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/035381.
PCT International Search Report and Written Opinion completed by the ISA/EP on Sep. 9, 2019 and issued in connection with PCT/US2019/035379.
PCT International Search Report and Written Opinion completed by the ISA/US on Jan. 24, 2021 and issued in connection with PCT/US2020/054975.
PCT International Search Report and Written Opinion completed by the ISA/EP on Mar. 8, 2021 and issued in connection with PCT/US2020/065300.
PCT International Search Report and Written Opinion completed by the ISA/US on Nov. 23, 2020 and issued in connection with PCT/US2020/052009.
PCT International Search Report and Written Opinion completed by the ISA/US on Mar. 18, 2021 and issued in connection with PCT/US2021/016325.
PCT International Search Report and Written Opinion completed by the ISA/US on Apr. 5, 2021 and issued in connection with PCT/US2021/016435.
PCT International Search Report and Written Opinion completed by the ISA/EP on Jul. 14, 2020 and issued in connection with PCT/US2020/029287.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro ion impact on solid surfaces. Nucl. Instrum. Methods. 170, 309-315 (1980).
Beuhler, et al., A study of the formation of high molecular weight water cluster ions (m/e < 59000) in expansion of onized gas mixtures, J. Chem. Phys. 77, 2549-2557 (1982).
Botamanenko, Daniel, et al., "Ion-Ion Interactions in Charge Detection Mass Spectrometry", J Am Soc Mass Spectrom. Dec. 2019 ; 30(12): 2741-2749. doi:10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, Brooke Ann, et al., "Charge Detection Mass Spectrometry Measurements of Exosomes and other Extracellular Particles Enriched from Bovine Milk" Anal. Chem., Just Accepted Manuscript • DOI: 10.1021/acs.analchem.9b05173 • Publication Date (Web): Jan. 28, 2020 Downloaded from pubs.acs.org on Jan. 30, 2020.
Brown, C., et al. "Chimeric Parvovirus B19 Capsids for the Presentation of Foreign Epitope",; Virology 198, pp. 477-488 (1994).
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
Japanese Office Action dispatched Jan. 6, 2023 for application 2020-568366—9 pages (References 1 and 2 and the Doussineau article cited in this document have been previously submitted).
Extended EP Search Report completed Aug. 29, 2024 and issued in connection with EP Appln. No. 24174366., 12 pages.
English translation of an Office Action for Japanese Patent Appln. No. 2022-547047, dated Aug. 1, 2024.
Japanese Office Action dispatched Jan. 24, 2023 for co-pending application 2021-527871—4 pages (Prior art reference Alexander Makarov has been previously submitted).
Japanese Office Action dispatched Jan. 31, 2023 for co-pending application 2020-568364—9 pages.
PCT International Search Report and Written Opinion completed by the ISA/US on Mar. 8, 2021 and issued in connection with PCT/US2020/065301.
Keifer, David Z., et al. "Charge Detection Mass Spectrometry: Weighing Heavier Things", Analyst, vol. 142, No. 10, Apr. 26, 2017 (Apr. 26, 2017), pp. 1654-1671.
English translation of an Office Action for Japanese Patent Appln. No. 2022-537367, dated Oct. 8, 2024, 6 pages.
English translation of an Office Action for Japanese Patent Appln. No. 2022-537360, dated Oct. 8, 2024, 3 pages.
European Office Action dated Dec. 9, 2024 and issued in connection with EP Appln. No. 20839501.2, 5 pages.
European Office Action dated Dec. 9, 2024 and issued in connection with EP Appln. No. 20839500.4, 5 pages.
Japanese Office Action (including English translation) issued in App. No. JP2022537360, dated Oct. 8, 2024, 6 pages.
Japanese Office Action (including English translation) issued in App. No. JP2022537367, dated Oct. 8, 2024, 11 pages.
Japanese Office Action (including English translation) issued in App. No. JP2022518995, dated Dec. 3, 2024, 6 pages.
Chinese Office Action (including English translation) issued in App. No. CN202080096842.5, dated Dec. 12, 2024, 19 pages.
Chinese Office Action (including English translation) issued in App. No. CN202080096856.7, issued on Feb. 17, 2025.

* cited by examiner

MASS SPECTROMETER WITH CHARGE MEASUREMENT ARRANGEMENT

CROSS-REFERENCE TO RELATED APPLICATIONS

This application is a U.S. national stage entry of PCT Application No. PCT/US2020/065301, filed Dec. 16, 2020, which claims the benefit of and priority to U.S. Provisional Patent Application Ser. No. 62/949,554, filed Dec. 18, 2019, the disclosures of which are incorporated herein by reference in their entireties.

TECHNICAL FIELD

The present disclosure relates generally to mass spectrometry instruments, and more specifically to mass spectrometry instruments configured to simultaneously measure ion mass-to-charge ratio and ion charge.

BACKGROUND

Conventional mass spectrometers and mass analyzers provide for the identification of chemical components of a substance by measuring mass-to-charge ratios of gas-phase ions generated from the substance. Spectral information produced by conventional mass spectrometers and mass analyzers is limited to mass-to-charge ratio information because such instruments lack the ability to measure particle charge.

SUMMARY

The present disclosure may comprise one or more of the features recited in the attached claims, and/or one or more of the following features and combinations thereof. In one aspect, a mass spectrometer may comprise an ion source region including an ion generator configured to generate ions from a sample, an ion detector configured to detect ions and produce corresponding ion detection signals, an electric field-free drift region disposed between the ion source region and the ion detector through which the generated ions drift axially toward the ion detector, a plurality of spaced-apart charge detection cylinders disposed in the drift region and through which the ions drifting axially through the drift region pass, and a plurality of charge amplifiers each coupled to a different one of the plurality of charge detection cylinders and each configured to produce a charge detection signal corresponding to a magnitude of charge of one or more of the generated ions passing through a respective one of the plurality of charge detection cylinders.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to apparatuses and techniques for measuring mass-to-charge ratios of charged particles and to also measure the charge magnitudes or charge states of the charged particles as they move through a drift region, and for determining masses of the charged particles as a function of the measured mass-to-charge ratios and measured charge magnitudes or charge states. For purposes of this document, the terms “charged particle” and “ion” may be used interchangeably, and both terms are intended to refer to any particle having a net positive or negative charge.

Figure 1:
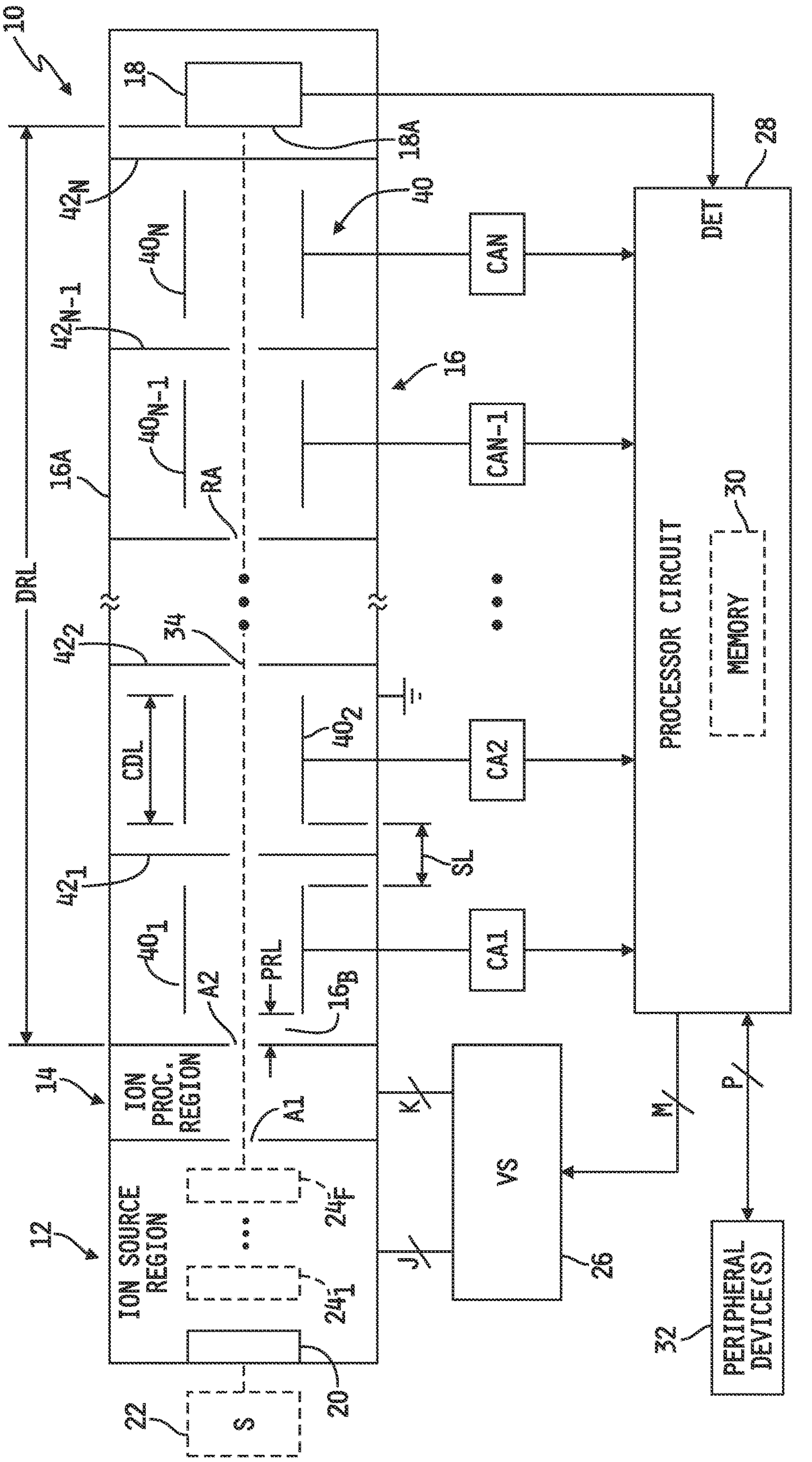
FIG. 1 is a simplified diagram of a mass spectrometer configured to separate and measure ions as a function of mass-to-charge ratio and to measure the charge magnitudes or charge states of the ions as they separate.

Referring now to FIG. 1, a diagram is shown of a mass spectrometer 10 configured to measure mass-to-charge ratios of charged particles and to also measure the charge magnitudes or charge states of the charged particles. In the illustrated embodiment, the mass spectrometer 10 includes an ion source region 12 coupled to an ion inlet A1 of an ion processing region 14, and an ion outlet A2 of the ion processing region 14 is coupled to one end of a drift region 16. An ion detector 18 is positioned at an opposite end of the drift region 16. In one embodiment, the ion detector 18 is a conventional microchannel plate detector having a detection surface 18A facing the drift region 16, although in other embodiments the ion detector 18 may be any conventional detector configured and operable to produce a signal in response to detection thereat of an ion moving through the drift region 16. Examples of other conventional instruments and apparatuses that may be implemented as the ion detector may include, but are not limited to, an ion-to-photon detector, a Faraday cup detector, an electron multiplier detector, any solid state detector, any detector with a high voltage collision dynode or the like.

In the embodiment depicted in FIG. 1, the drift region 16 is a linear drift region defined within an elongated drift tube 16A. The drift region 16 has a length DRL between the outlet A2 of the ion processing region 14 and the ion detection surface 18A of the ion detector 18, and a longitudinal axis 34 extends centrally through the drift region 16 and centrally through each of the inlet and outlet A1, A2 respectively of the ion processing region 14. It will be understood that whereas the drift region 16 is illustrated in FIG. 1 in the form of a linear drift region, the drift region 16 may, in alternate embodiments, be non-linear in whole or in part. As one non-limiting example, the drift region 16 may be provided in the form of a circular drift region including conventional ion inlet (i.e., entrance) and ion outlet (i.e., exit) structures. Other examples of at least partially non-linear drift regions will occur to those skilled in the art, and it will be understood that any such alternate configurations are intended to fall within the scope of this disclosure.

As will be described in greater detail below, the ion source 12 illustratively includes any conventional device or apparatus 20 for generating ions from a sample 22 and may further include one or more devices and/or instruments $\mathbf{24}_1$-$\mathbf{24}_F$ for separating, collecting and/or filtering ions according to one or more molecular characteristics and/or for and/or dissociating, e.g., fragmenting, ions. As one illustrative example, which should not be considered to be limiting in any way, the ion generator 20 may include a conventional electrospray ionization (ESI) source, a matrix-assisted laser desorption ionization (MALDI) source or other conventional ion generator configured to generate ions from the sample 22. The sample 22 from which the ions are generated may be any biological or other material.

A voltage source 26 is electrically connected to the ion source or source region 12 via a number, J, of signal paths, and is electrically connected to the ion processing region 14 via a number K, of signal paths where J and K may each be any positive integer. In some embodiments, the voltage source 26 may be implemented in the form of a single voltage source, and in other embodiments the voltage source 26 may include any number of separate voltage sources. In some embodiments, the voltage source 26 may be configured or controlled to produce and supply one or more time-invariant (i.e., DC) voltages of selectable magnitude. Alternatively or additionally, the voltage source 26 may be configured or controlled to produce and supply one or more switchable time-invariant voltages, i.e., one or more switchable DC voltages. Alternatively or additionally, the voltage source 26 may be configured or controllable to produce and supply one or more time-varying signals of selectable shape, duty cycle, peak magnitude and/or frequency. As one specific example of the latter embodiment, which should not be considered to be limiting in any way, the voltage source 26 may be configured or controllable to produce and supply one or more time-varying voltages in the form of one or more sinusoidal (or other shaped) voltages in the radio frequency (RF) range.

The voltage source 26 is illustratively shown electrically connected by a number, M, of signal paths to a conventional processor 28, where M may be any positive integer. The ion detector 18 is also electrically connected to the processor 28 via at least one signal path. The processor 28 is illustratively conventional and may include a single processing circuit or multiple processing circuits. The processor 28 illustratively includes or is coupled to a memory 30 having instructions stored therein which, when executed by the processor 28, cause the processor 28 to control the voltage source 26 to produce one or more output voltages for selectively controlling operation of the ion source region 12 and one or more output voltages for selectively controlling operation of the ion processor region 14. The instructions stored in the memory 30 further illustratively include instructions for processing ion detection signals produced by the ion detector 18 to determine ion mass-to-charge ratio values in a conventional manner. In some embodiments, the processor 28 may be implemented in the form of one or more conventional microprocessors or controllers, and in such embodiments the memory 30 may be implemented in the form of one or more conventional memory units having stored therein the instructions in a form of one or more microprocessor-executable instructions or instruction sets. In other embodiments, the processor 28 may be alternatively or additionally implemented in the form of a field programmable gate array (FPGA) or similar circuitry, and in such embodiments the memory 30 may be implemented in the form of programmable logic blocks contained in and/or outside of the FPGA within which the instructions may be programmed and stored. In still other embodiments, the processor 28 and/or memory 30 may be implemented in the form of one or more application specific integrated circuits (ASICs). Those skilled in the art will recognize other forms in which the processor 28 and/or the memory 30 may be implemented, and it will be understood that any such other forms of implementation are contemplated by, and are intended to fall within, this disclosure. In some alternative embodiments, the voltage source 26 may itself be programmable to selectively produce one or more constant and/or time-varying output voltages.

The processor 28 is further illustratively coupled via a number, P, of signal paths to one or more peripheral devices 32 (PD), where P may be any positive integer. The one or more peripheral devices 32 may include one or more devices for providing signal input(s) to the processor 28 and/or one or more devices to which the processor 28 provides signal output(s). In some embodiments, the peripheral devices 32 include at least one of a conventional display monitor, a printer and/or other output device, and in such embodiments the memory 30 has instructions stored therein which, when executed by the processor 28, cause the processor 28 to control one or more such output peripheral devices 32 to display and/or record analyses of the stored, digitized charge detection signals.

In the illustrated embodiment, the ion source or source region 12 illustratively includes at least one ion generator 20 coupled to the voltage source 26. The processor 28 is illustratively programmed, e.g., via instructions stored in the memory 30, to control the voltage source 26 to produce one or more voltages to cause the ion generator 20 to generate ions from the sample 22. In some embodiments, the ion generator 20 and the sample 22 are positioned within the ion source region 12, in other embodiments the ion generator 20 and the sample 22 are both positioned outside of the ion source region 12 and in still other embodiments the sample 22 is positioned outside of the ion source region 12 and the ion generator 20 is positioned inside the ion source region 12 but fluidly or otherwise operatively coupled to the sample 22 as illustrated by dashed-line representation in FIG. 1. In one embodiment, the ion generator 20 is a conventional electrospray ionization (ESI) source configured to generate ions from the sample in the form of a fine mist of charged droplets. In alternate embodiments, the ion generator 20 may be or include a conventional matrix-assisted laser desorption ionization (MALDI) source. It will be understood that ESI and MALDI represent only two conventional ion generators, and that the ion generator 20 may alternatively be provided in the form of any conventional device or apparatus for generating ions from a sample.

In some embodiments, the ion source or source region 12 may further include one or more ion processing stage(s) $\mathbf{24}_1$-$\mathbf{24}_F$, where F may be any positive integer. In such embodiments, the processor 28 is illustratively programmed to control the voltage source 26 to produce one or more voltages to control operation of the one or more ion processing stage(s) $\mathbf{24}_1$-$\mathbf{24}_F$. Examples of such ion processing stage(s) $\mathbf{24}_1$-$\mathbf{24}_F$ may include, but are not limited to, in any order and/or combination, one or more devices and/or instruments for separating, collecting and/or filtering charged particles according to one or more molecular characteristics, and/or one or more devices and/or instruments for dissociating, e.g., fragmenting, charged particles. Examples of the one or more devices and/or instruments for separating charged particles according to one or more molecular characteristics include, but are not limited to, one or more mass spectrometers or mass analyzers, one or more ion mobility spectrometers, one or more gas or liquid chromatographs, and the like. Examples of the mass spectrometer or mass analyzer, in embodiments of the ion source 12 which include one or more thereof, include, but are not limited to, a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like. Examples of the ion mobility spectrometer, in embodiments of the ion source 12 which include one or more thereof, include, but are not limited to, a single-tube linear ion mobility spectrometer, a multiple-tube linear ion mobility spectrometer, a circular-tube ion mobility spectrometer, or the like. Examples of one or more devices and/or instruments for collecting charged particles include, but are not limited to, a quadrupole ion trap, a hexapole ion trap, or the like. Examples of one or more devices and/or instruments for filtering charged particles include, but are not limited to, one or more devices or instruments for filtering charged particles according to mass-to-charge ratio, one or more devices or instruments for filtering charged particles according to particle mobility, and the like. Examples of one or more devices and/or instruments for dissociating charged particles include, but are not limited to, one or more devices or instruments for dissociating charge particles by e collision-induced dissociation (CID), surface-induced dissociation (SID), electron capture dissociation (ECD) and/or photo-induced dissociation (PID), or the like. It will be understood that the ion processing stage(s) $\mathbf{24}_1$-$\mathbf{24}_F$ may include one or any combination, in any order, of any such conventional ion separation instruments and/or ion processing instruments, and that some embodiments may include multiple adjacent or spaced-apart ones of any such conventional ion separation instruments and/or ion processing instruments.

A charge detector array 40 is illustratively disposed within, or integral with, the drift region 16. In the embodiment illustrated in FIG. 1, the charge detector array 40 illustratively includes a plurality, N, of spaced-apart, cascaded, charge detection cylinders $40_1$-$40_N$, where N may be any positive integer greater than 2. In one example embodiment, which should not be considered limiting in any way, N may be approximately 100, although in other embodiments N may be less than 100 or greater than 100. In any case, the charge detection cylinders $40_1$-$40_N$ each define a bore therethrough so as to allow ions to pass through the respective cylinder, and in the illustrated embodiment the charge detection cylinders $40_1$-$40_N$ are arranged end-to-end so that the central, longitudinal axis 34 of the drift region 16 passes centrally through each. In the illustrated embodiment, each charge detection cylinder $40_1$-$40_N$ defines a length CDL between ion inlet and ion outlet ends thereof, although in alternate embodiments one or more of the charge detection cylinders $40_1$-$40_N$ may have a length that is greater or less than the length CDL. The minimum CDL is illustratively that which is physically realizable and which will produce an electrically detectable signal response to one or more ions passing therethrough. Although no upper limit on CDL exists in theory, practical considerations, such as available space and instrument operating conditions, will typically limit the maximum useful CDL in any particular application.

In the illustrated embodiment, each of a plurality of ground rings $42_1$-$42_{N-1}$ is positioned within the space defined between each adjacent pair of charge detection cylinders $40_1$-$40_N$, and another ground ring $42_N$ is positioned adjacent to the ion outlet of the last charge detection cylinder $40_N$. Each ground ring $42_1$-$42_N$ illustratively defines a ring aperture RA therethrough and through which the longitudinal axis 34 centrally passes, where RA is illustratively less than or equal to the inner diameters of the charge detection cylinders $40_1$-$40_N$. In the illustrated embodiment, the charge detection cylinders $40_1$-$40_N$ are axially spaced apart from one another by a space length SL. In the illustrated embodiment, each of the ground rings $42_1$-$42_{N-1}$ is positioned to radially bisect the space SL between the ion inlets and ion outlets of respective adjacent ones of the charge detection cylinders $40_2$-$40_N$ such that the distance between each ground ring $42_1$-$42_N$ and respective adjacent ones of the charge detection cylinders $40_1$-$40_N$ is SL/2, and the ground ring $42_N$ is positioned to bisect the space SL between the ion outlet of the charge detection cylinder $40_N$ and the detection surface 18A of the ion detector 18 such that the distance from the ground ring $42_N$ to each is SL/2. In some embodiments, one or more of the ground rings $42_1$-$42_N$ may be omitted.

Figure 13:
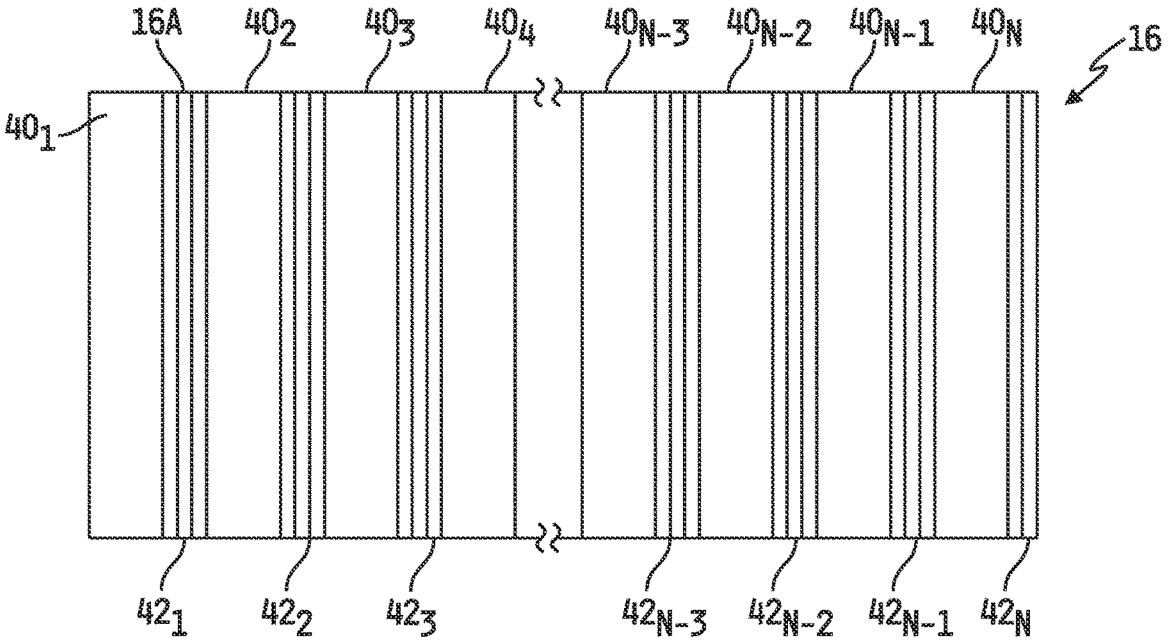
FIG. 13 is a perspective view of an embodiment of the field-free drift region of FIG. 1 in the form of an elongated, electrically insulating sheet having a plurality of spaced-apart electrically conductive strips formed on one surface thereof.
Figure 14:
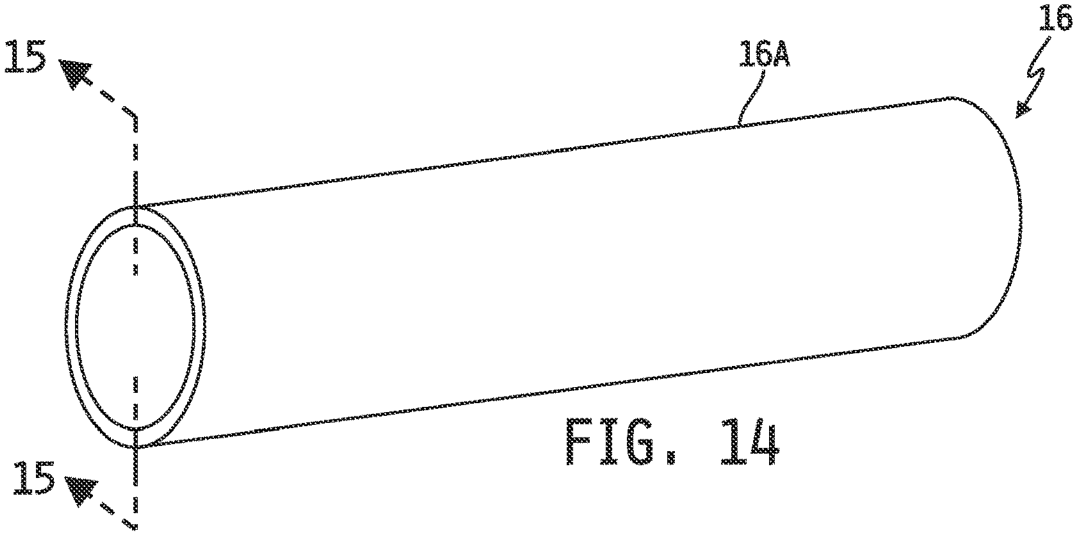
FIG. 14 is a perspective view of the sheet of FIG. 13 shown with opposite sides joined to form the field-free drift region in the form of a field-free drift tube.
Figure 15:
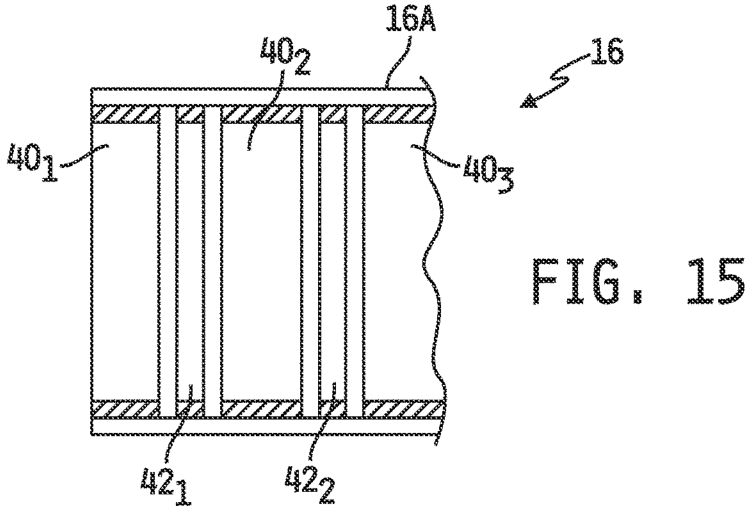
FIG. 15 is a cross-sectional view of the field-free drift tube of FIGS. 13 and 14 as viewed along section lines 15-15 of FIG. 14.

In one example embodiment, the drift tube 16A is provided in the form of an electrically conductive cylinder which is illustratively coupled to ground potential (as depicted in FIG. 1) or to another reference potential, and within which the plurality of charge detection cylinders $40_1$-$40_N$ are suitably mounted. In such embodiments which include one or more ground rings $42_1$-$42_N$, such one or more ground rings may be electrically and mechanically coupled to an inner surface of the electrically conductive cylinder, or may be formed integral with the electrically conductive cylinder such that the electrically conductive cylinder and the one or more ground rings $42_1$-$42_N$ are of unitary construction. In another example embodiment, the drift tube 16A may be formed of an interconnected series of alternating electrically conductive or electrically insulating spacers and respective ones of the plurality of ground rings $42_1$-$42_N$, and within which the plurality of charge detection cylinders $40_1$-$40_N$ may be suitably mounted. In still another example embodiment, the drift tube 16A may be provided in the form of a rollable sheet of flexible or semi-flexible, electrically insulating material, e.g., a flexible circuit board, to which a plurality of spaced-apart, parallel, electrically conductive strips are attached or upon which a plurality of spaced-apart, parallel, electrically conductive strips are formed in a conventional manner, e.g., using conventional metallic pattern deposition techniques. A non-limiting example of this embodiment is illustrated in FIGS. 13-15 and will be described in detail below. Those skilled in the art will recognize other forms in which the drift tube 16A and/or the charge detection cylinders $40_1$-$40_N$ and/or the one or more ground rings $42_1$-$42_N$ (in embodiments which include them) may be provided, and it will be understood the any such other forms are intended to fall within the scope of this disclosure.

Each charge detection cylinder $40_1$-$40_N$ is electrically connected to a signal input of a corresponding one of N charge sensitive amplifiers CA1-CAN, and the signal outputs of each charge amplifier CA1-CAN is electrically connected to the processor 28. As charged particles entering the drift tube 16A from the ion outlet A2 of the ion processing region 14, the entering charged particles move axially through the drift region 16 toward and into the sensing face 18A of the ion detector 18. As the charged particles move axially through the drift tube 16A, each such charged particle passes sequentially through the plurality of charge detection cylinders $40_1$-$40_N$. As each such charged particle passes through each successive charge detection cylinder $40_1$-$40_N$, a charge is induced thereon by the charged particle, wherein the induced charge has a magnitude that is proportional to the magnitude of the charge of that particle. The charge amplifiers CA1-CAN are each illustratively conventional and responsive to charges induced by charged particles on a respective one of the charge detectors $40_1$-$40_N$ to produce a corresponding and respective charge detection signal at the output thereof. The charge detection signals produced by the charge amplifiers CA1-CAN are supplied to the processor 28. The magnitudes of the charge detection signals produced by the charge amplifiers CA1-CAN are, at any point in time, proportional to: (i) in the case of a single charged particle passing through a respective one of the charge detection cylinders $40_1$-$40_N$, the magnitude of the charge of that single charged particle, or (ii) in the case of multiple charged particles simultaneously passing through a respective one of the charge detection cylinders $40_1$-$40_N$, the combined magnitudes of the charges of those multiple charged particles. The processor 28 is, in turn, illustratively operable to receive and digitize the charge detection signals produced by each of the charge amplifiers CA1-CAN, and to store the digitized charge detection signals in the memory 30 or in one or more other memory units coupled to or otherwise accessible by the processor 28.

The drift region 16 of the mass spectrometer 10 is a field-free drift region (i.e., no electric field), and charged particles ions entering the drift tube 16A via the ion outlet A2 of the ion processing region 14 with initial velocities drift toward and into the detection face 18A of the ion detector 18 with substantially constant velocities. In this regard, the ion source 12 and/or the ion processing region 14 will typically provide a motive force for passing ions into the drift tube 16A with initial velocities. The motive force may illustratively be provided in any one or combination of several different forms, examples of which may include, but are not limited to, one or more ion-accelerating electric fields, one or more magnetic fields, a pressure differential between the external environment and the ion source 12 and/or a pressure differential between the ion source 12 and the drift tube 16A, or the like. In any case, as the charged particles drift through the field-free drift region 16, they will separate in time according to mass-to-charge ratio with the charged particles having lower mass-to-charged ratios reaching the ion detector 18 more quickly than the charged particles having higher mass-to-charge ratios.

As briefly described above, the memory 30 illustratively includes instructions executable by the processor 28 to (a) cause the processor 28 to control the voltage source 26 in a conventional manner to (i) cause the ion generator 20 to generate charged particles, and (ii) to pass single ones of the charged particles, to pass specified groups or sets of the charged particles, or to pass all of the generated charged particles, from the ion processing region 14 into the drift region 16 through which the charged particle(s) move, each with constant energy, axially toward and into the ion detector 18, and to (b) process detection signals produced by the ion detector 18 in a conventional manner to determine mass-to-charge ratios of the charged particles reaching the detector 18. In the embodiment of the mass spectrometer 10 illustrated in FIG. 1, the memory 30 further illustratively includes instructions executable by the processor 28 to process the detection signals produced by the ion detector 18 and the detection signals produced by each of, or at least some of, the charge amplifiers CA1-CAN to determine the charge magnitudes and/or charge states of each of the charged particles having moved axially through the drift region 16, and to then determine the particle masses based on the measured particle mass-to-charge ratios and the measured particle charge magnitudes or charge states. In some embodiments, such as when the ion source 12 and/or the ion processing region 14 is/are configured to generate and supply a plurality of ions simultaneously from the ion outlet A2 of the ion processing region 14 into the drift region 16, for example, it may be desirable to configure the drift tube 16A to include a pre-array space of length PRL between the ion outlet A2 of the ion processing region 14 and the ion inlet end of the first charge detection cylinder 161 (or between the ion outlet A2 and the ion inlet of a ground ring that may be placed in front of the ion inlet end of the first charge detection cylinder 161) as illustrated by example in FIG. 1. This will allow the charged particles moving axially through the drift region 16 to undergo some amount of axial separation in time (as a function of mass-to-charge ratio in the field-free region 16) prior to conducting charge measurements with the charge detector array 16, and may thereby increase the quality and usefulness of the charge detection signals produced by the first one or more of the charge amplifiers CA1-CAN. The length PRL of the pre-array space 16B may illustratively be chosen based on the application, and in some embodiments the pre-array space 16B may be omitted in its entirety.

Figure 2:
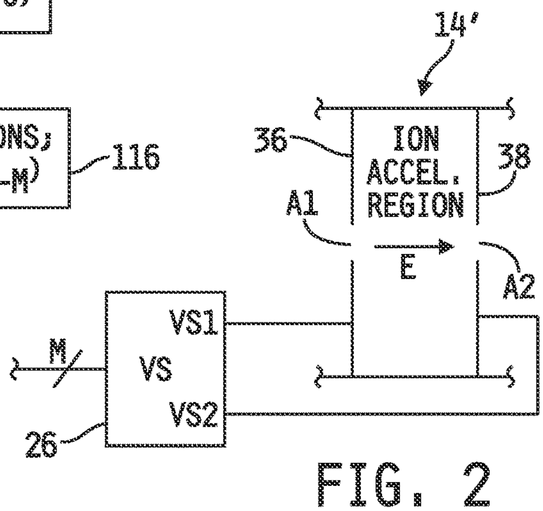
FIG. 2 is a simplified diagram of the ion processing region of the spectrometer of FIG. 1 embodied in the form of an ion acceleration region to configure the spectrometer of FIG. 1 as an embodiment of a time-of-flight (TOF) mass spectrometer.

Referring now to FIG. 2, an embodiment of the ion processing region 14 is shown implemented in the form of an ion acceleration region 14'. In the embodiment illustrated in FIG. 2, the ion acceleration region 14' includes an electrically conductive gate 36 defining the ion inlet A1 and another electrically conductive gate 38 defining the ion outlet A2. The gates 36, 38 are axially spaced apart from one another with the gate 36 positioned adjacent to the ion source region 12 and the gate 38 positioned adjacent to the inlet end of the drift tube 16A. In one embodiment, the gates 36, 38 are illustratively each provided in the form of an electrically conductive plate or ring defining the respective inlet/outlet A1, A2 therethrough. In some such embodiments, the ion acceleration region 14' may include one or more conventional radial focusing structures or devices configured and/or controlled, e.g., by the processor 28 in a conventional manner, to direct charged particles through the ion outlet A2. In some alternate embodiments, one or both of the gates 36, 38 may be provided in the form of an electrically conductive grid or other conventional electrically conductive gate structure. In any case, a voltage output VS1 of the voltage source 26 is electrically connected to the electrically conductive gate 36, and another voltage output VS2 of the voltage source 26 is electrically connected to the electrically conductive gate 38.

Operation of the ion acceleration region 14' is conventional in that, with one or more generated ions having entered the ion acceleration region 14' via the ion inlet A1, the processor 28 is operable to control the voltage source 26 create an electric field E between the gates 36, 38 that is oriented to accelerate ions through the ion outlet A2 and into the inlet end of the drift tube 16A. In the case of positively charged particles, the voltages VS1 and VS2 are selected to create an electric field E between the gates 36, 38 in the direction depicted in FIG. 2, and in the case of negatively charged particles the voltages VS1 and VS2 will be selected to create an electric field between the gates 36, 38 in the opposite direction from what is depicted in FIG. 2. In either case, the generated electric field E operates to accelerate the one or more generated ions contained in the ion acceleration region 14' into the drift region 16 through which it/they drift axially toward the ion detector 18 each with constant energy. With the ion processing region 14 implemented as an ion acceleration region 14' as illustrated by example in FIG. 2, the mass spectrometer 10 is structurally a time-of-flight (TOF) mass spectrometer with a charge detector array 40 axially arranged in, as part of or defining the field-free drift tube 16A.

Figure 3:
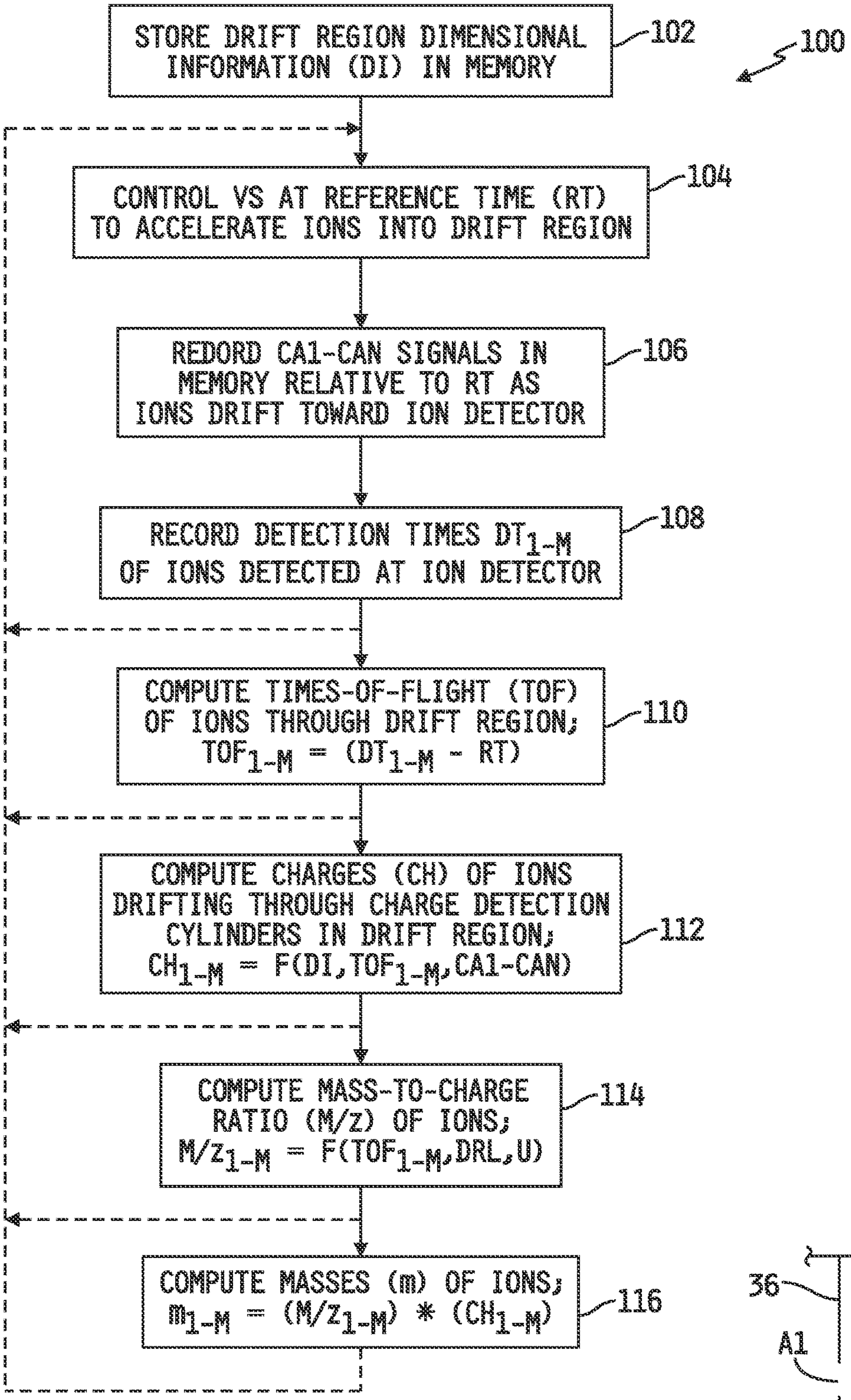
FIG. 3 is a flowchart illustrating an embodiment of a simplified process for operating the TOF mass spectrometer of FIGS. 1 and 2 to separate and measure ions as a function of mass-to-charge ratio and to measure the charge magnitudes or charge states of the ions as they separate.

Referring now to FIG. 3, a simplified flowchart is shown depicting an example process 100 for operating the TOF mass spectrometer of FIGS. 1 and 2 (i.e., the mass spectrometer 10 of FIG. 1 with the ion acceleration region 14' of FIG. 2 implemented as the ion processing region 14) to measure ion mass-to-charge ratio, ion charge (magnitude and/or charge state) and ion mass. The process 100 is illustratively stored in the memory 30 in the form of instructions executable by the processor 28 to carry out the measurements of particle mass-to-charge ratio, particle charge and particle mass. The process 100 illustratively starts at the point in which one or more charged particles generated by the ion generator 20 reside(s) within the ion acceleration region 14', i.e., between the gates 36, 38. Prior to the process 100, the processor 28 will have controlled the voltage source 26 in a conventional manner to cause the ion generator 20 to generate a plurality of ions. In embodiments in which the ion source 12 does not include any of the ion processing stages $\mathbf{24}_1$-$\mathbf{24}_F$ (see FIG. 1) most, if not all, of the generated plurality of ions will pass through the inlet A1 and reside in the ion acceleration region 14', in some cases assisted by control of the voltage source 26 to control one or both the output voltages VS1, VS2 relative to the voltage applied to the ion generator 20, if any.

In alternate embodiments in which the ion source 12 includes one or more of the ion processing stages $\mathbf{24}_1$-$\mathbf{24}_F$ (see FIG. 1), the processor 28 is operable to control the voltage source 26 to control or otherwise operate the one or more ion processing stages $\mathbf{24}_1$-$\mathbf{24}_F$ in a conventional manner to supply a subset of the generated plurality of ions to the ion acceleration region 14' and/or to supply a modified set of the generated plurality of ions to the ion acceleration region 14'. In one example embodiment, which should not be considered to be limiting in any way, the one or more ion processing stages $24_1$-$24_F$ may be implemented in the form of a conventional mass-to-charge ratio filter, e.g., such as a quadrupole filter, and the processor 28 may be operable in this example embodiment to control the voltage source 26 to pass to the ion acceleration region 14' a subset of the generated plurality of ions having mass-to-charge ratios above or below a threshold mass-to-charge ratio value or having mass-to-charge ratios within a specified range of mass-to-charge ratios. In another example embodiment, which should likewise not be considered to be limiting in any way, the one or more ion processing stages $24_1$-$24_F$ may alternatively or additionally include a dissociation stage operable, or controllable by the processor 28, to dissociate, e.g., fragment, the generated plurality of ions or a subset thereof, in which case a modified set of the generated plurality of charged particles is passed to the ion acceleration region 14'. In yet another example embodiment, which should not be considered to be limiting in any way, the one or more ion processing stages $24_1$-$24_F$ may include an ion mobility spectrometer controllable by the processor 28 to pass to the ion acceleration region 14' a subset of the generated plurality of ions having ion mobility values above or below a threshold ion mobility value or having ion mobility values within a specified range of ion mobility values. Those skilled in the art will recognize other instruments or stages, and combinations of instruments or stages, that may be implemented as the one or more ion processing stages $24_1$-$24_F$, and it will be understood that any such other instruments or stages and/or combination of instruments or stages are intended to fall within the scope of this disclosure. Generally, the one or more ion processing stages $24_1$-$24_F$, in embodiments of the ion source 12 which includes one or more ion processing stages $24_1$-$24_F$, may be implemented in the form of one or more instruments or stages and/or various combinations thereof configured to separate, collect and/or filter ions according to one or more molecular characteristics and/or to dissociate, e.g., fragment, ions.

Referring again to FIG. 3, the process 100 illustratively begins at step 102 where the processor 28 is illustratively operable to store in the memory 30 at least some of the dimensional information (DI) of the drift region 16. In some embodiments, step 102 is partially executed by the processor 28 and partially executed manually, e.g., by keying the dimensional information into the memory 30 using a peripheral device 32 coupled to the processor 28, and in other embodiments the processor 28 may execute step 102 in its entirety, e.g., by reading DI from a file stored in the memory 30 or on an external memory device readable by a peripheral device 32 coupled to the processor 28. In one embodiment, DI illustratively includes at least the total length DRL of the drift region 16, i.e., between the ion outlet A2 of the ion acceleration region 14' and the ion detection face 18A of the ion detector 18, the length CDL of the plurality of charge detection cylinders $40_1$-$40_N$, the space length SL between adjacent charge detection cylinders $40_1$-$40_N$, the total number N of charge detection cylinders $40_1$-$40_N$, the pre-array length PRL, if any, and the distance between the ion outlet end of the last charge detection cylinder $40_N$ and the ion detection face 18A of the ion detector if different than SL. The dimensional information (DI) is illustratively stored for the purpose of matching each of the charged particles moving axially through the drift region 16 with corresponding times during which the charged particle traveled axially through each of the charge detection cylinders $40_1$-$40_N$ or through at least a subset of the charge detection cylinders $40_1$-$40_N$.

Following step 102, the process 100 advances to step 104 where the processor 28 is operable to control the voltage source 26 at a reference time RT to cause the voltage source 26 to produce or switch the voltages VS1 and VS2 to values which establish an ion accelerating electric field in the ion acceleration region 14' oriented to accelerate the charged particles resident in the ion acceleration region 14' through the ion outlet A2 thereof and into the drift region 16 such that the charged particles drift axially through the drift region 16 each with a respective constant velocity. For the purpose of describing the process 100, it will be assumed that at RT a number M of charged particles are accelerated from the ion acceleration region 14' into drift region 16, where M may be any positive integer.

Following step 104, the process 100 advances to step 106 where the processor 28 is operable to record, i.e., store, the charge detection signals produced by each of the charge amplifiers CA1-CAN, or at least a subset thereof, relative to RT as the M charged particles accelerated into the drift region 16 drift axially toward the ion detector 18. In one embodiment, the processor 28 is operable at step 106 to sample the charge detection signals produced by the charge amplifiers CA1-CAN at a selected sample rate. In some embodiments, the processor 28 may be operable to successively discontinue sampling each charge detection signal as that charge detection signal ceases activity, i.e. after all of the charged particles accelerated in to the drift region 16 at step 104 have passed through the respective charge detection cylinder $40_1$-$40_N$. In other embodiments, the processor 28 may be operable to discontinue sampling after detection of the last of the charged particles at the ion detector 18.

In any case, the process advances from step 106 to step 108 where the processor 28 is operable to record, i.e., store in the memory 30, the detection times $DT_1$-$DT_M$, relative to the reference time RT, as each of the M charged particles reach, and are detected by, the detection face 18A of the ion detector 18. Thereafter at step 110, the processor 28 is operable to compute, and store in the memory 30, the times-of-flight (TOF) of the M charged particles each as a function of the reference time RT and the respective one of the stored detection times $DT_1$-$DT_M$, e.g., $TOF_{1-M}=(DT_{1-M}-RT)$. Thus, after detection of the Mth charged particle at the ion detector 18, the memory 30 has stored therein M time-of-flight values, $TOF_{1-M}$.

Following step 110, the process 100 advances to step 112 where the processor 28 is operable to compute and store in the memory 30 the charge magnitudes or charge states (CH) of the M charged particles based on, or as a function of, the stored dimensional information DI, the respective stored times-of-flight $TOF_{1-M}$, and the stored charge detection signals produced by all or at least a subset of the charge amplifiers CA1-CAN, e.g., $CH_{1-M}=F$ (DI, $TOF_{1-M}$, CA1-CAN).

Following step 112, the process 100 advances to step 114 where the processor 28 is operable to compute and store in the memory 30 the mass-to-charge ratios (m/z) of the M charged particles in a conventional manner as a known function of the respective times of flight $TOF_{1-M}$, the length DRL of the drift region 16 and a potential U relating to the magnitude(s) of the voltages VS1, VS2 to accelerate the charged particles from the ion acceleration region 14' into the drift region 16, e.g., $m/z_{1-M}=F$ ($TOF_{1-M}$, DRL, U).

Following step 114, the process 100 advances to step 116 where the processor 28 is operable to compute and store in the memory 30 the mass values (m) of the M charged particles in a conventional manner, e.g., as a product of m/z and CH, e.g., $m_{1-M}=m/z_{1-M}*CH_{1-M}$.

It will be understood that the process 100 may loop back to step 104, assuming a new set or subset of charged particles is resident in the ion acceleration region 14', at any time after the last charged particle M has reached the ion detector 18. As such, the process 100 may loop back to step 104 following any of steps 108-116, as depicted by dashed-line representation in FIG. 3, and the remainder of the steps 110-116 following the loop may be executed separately from the controlled operation of the mass spectrometer 10.

Figure 7:
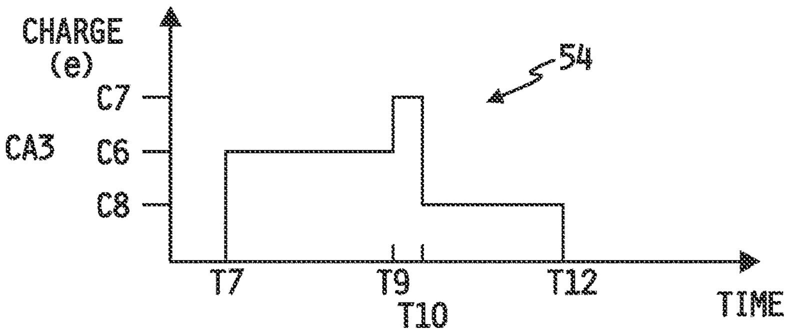
FIG. 7 is a plot of charge magnitude vs. time illustrating an example output of the charge amplifier CA3 as the two example charged particles pass through the third charge detection cylinder disposed in the drift region adjacent to the second charge detection cylinders and adjacent to the ion detector during the time window T7-T12 (relative to T0) as depicted in FIGS. 4G-4L.
Figure 8:
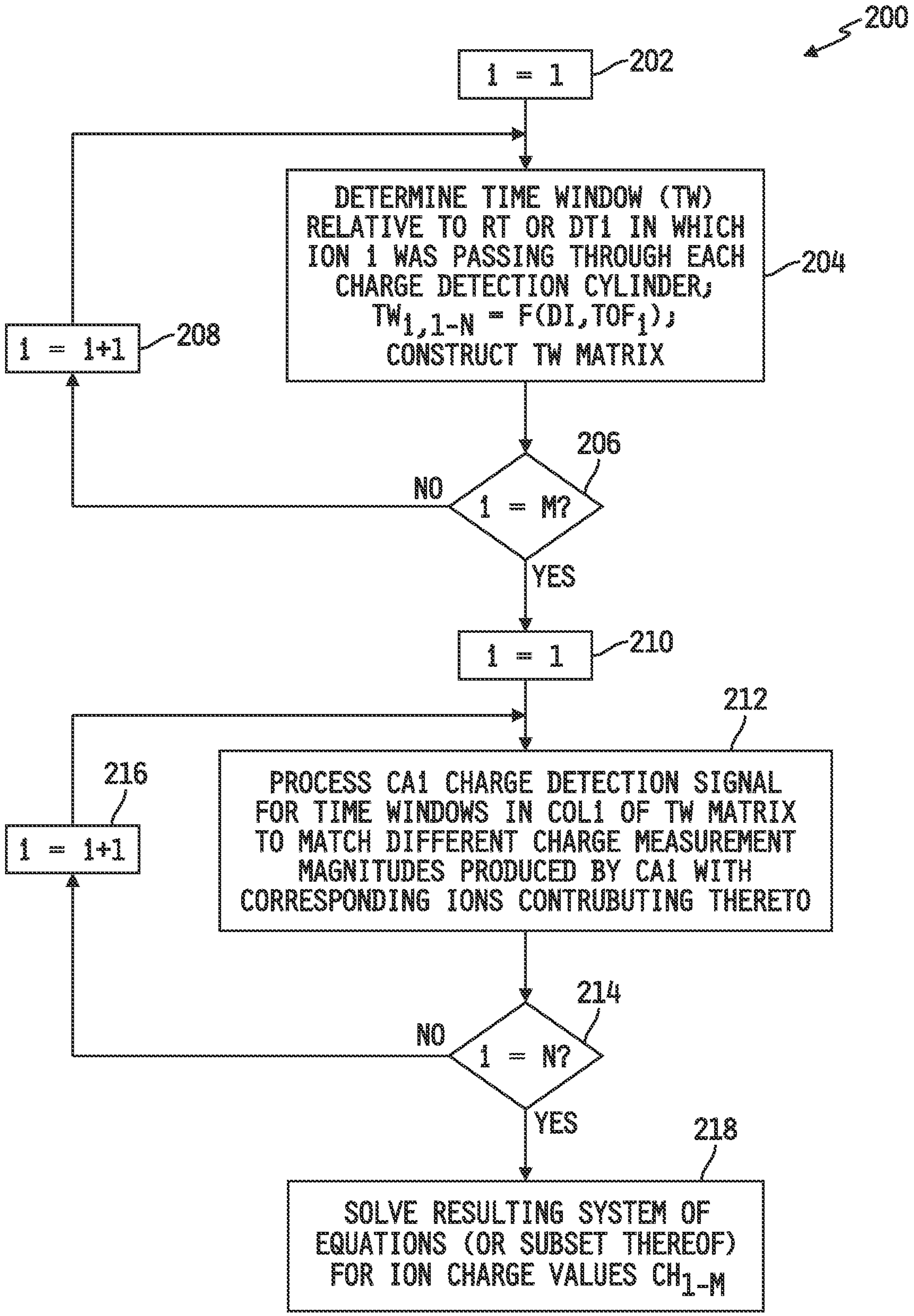
FIG. 8 is a flowchart illustrating an embodiment of a portion of the process illustrated in FIG. 3 to determine the charge values of the ions separating in time axially through the drift region.

The processor 28 may illustratively execute step 112 of the process 100 using various different processes or algorithms. An example of one such process 200 for executing step 112 of the process 100 is illustrated in FIG. 8, and will be described in detail below. Prior to describing this process, however, a simplified example of two charged particles P1 and P2 of different mass-to-charge ratios moving axially through a simplified drift region 16 including three axially arranged charge detection cylinders $40_1$-$40_3$ will be described with reference to FIGS. 4A-7, and this example will be used to demonstrate operation of the process 200 illustrated in FIG. 8.

Figure 5:
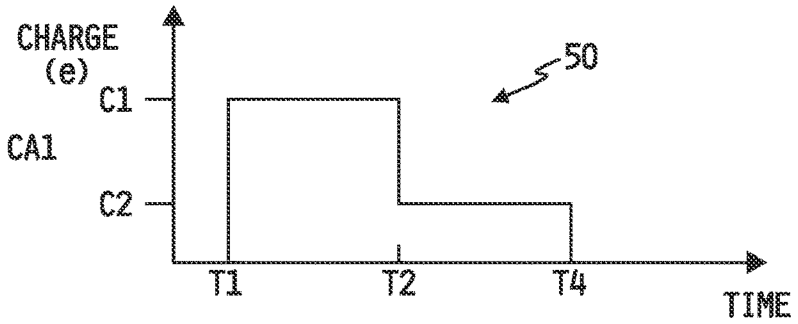
FIG. 5 is a plot of charge magnitude vs. time illustrating an example output of the charge amplifier CA1 as the two example charged particles pass through the first charge detection cylinder disposed in the drift region adjacent to the outlet of the acceleration region during the time window T1-T4 (relative to T0) as depicted in FIGS. 4A-4D.
Figure 4E:
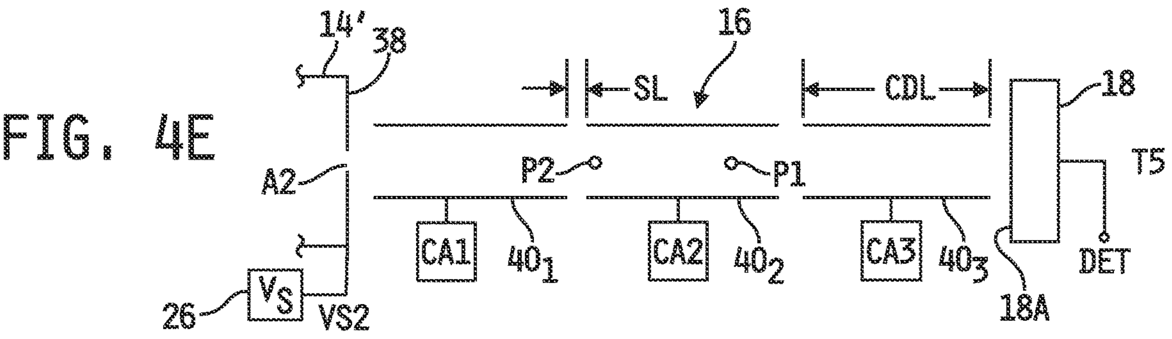
FIG. 4E is a simplified diagram similar to FIGS. 4A-4D illustrating respective positions of the two example charged particles in the field-free drift region at a time T5>T4.
Figure 4F:
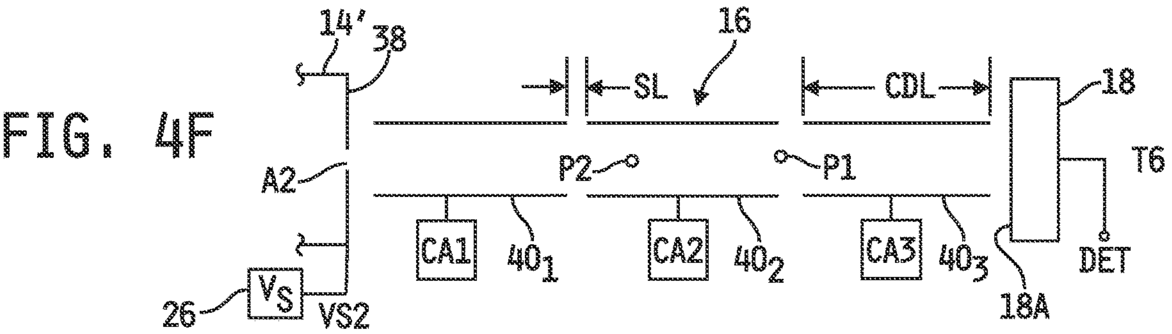
FIG. 4F is a simplified diagram similar to FIGS. 4A-4E illustrating respective positions of the two example charged particles in the field-free drift region at a time T6>T5.
Figure 4G:
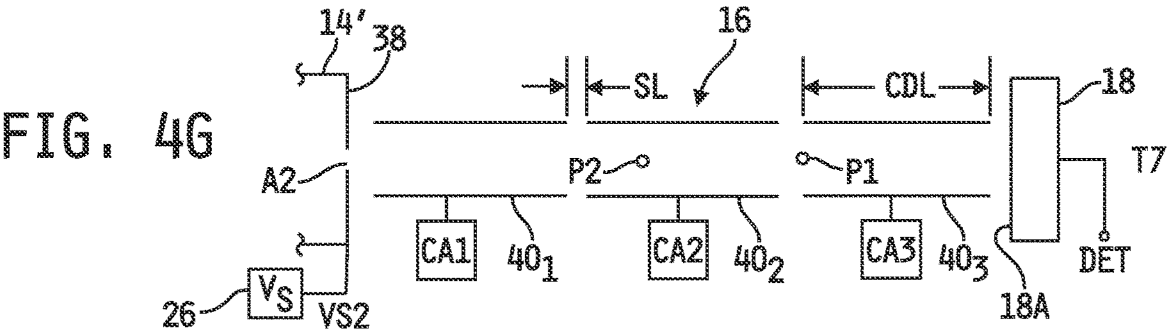
FIG. 4G is a simplified diagram similar to FIGS. 4A-4F illustrating respective positions of the two example charged particles in the field-free drift region at a time T7>T6.
Figure 4H:
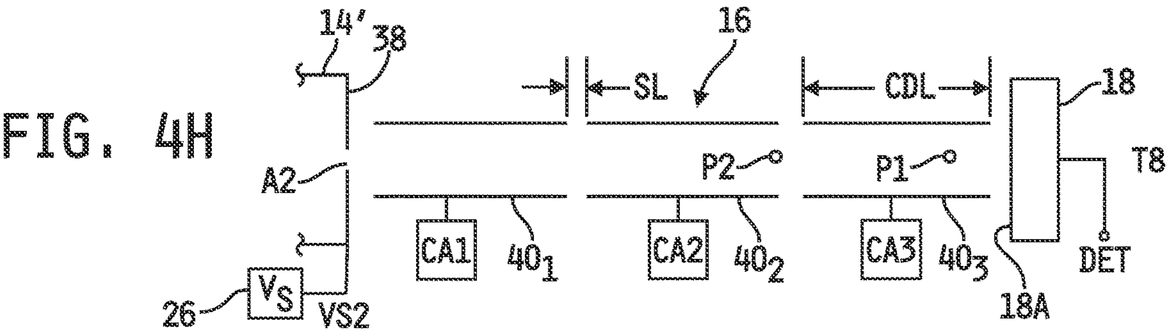
FIG. 4H is a simplified diagram similar to FIGS. 4A-4G illustrating respective positions of the two example charged particles in the field-free drift region at a time T8>T7.
Figure 6:
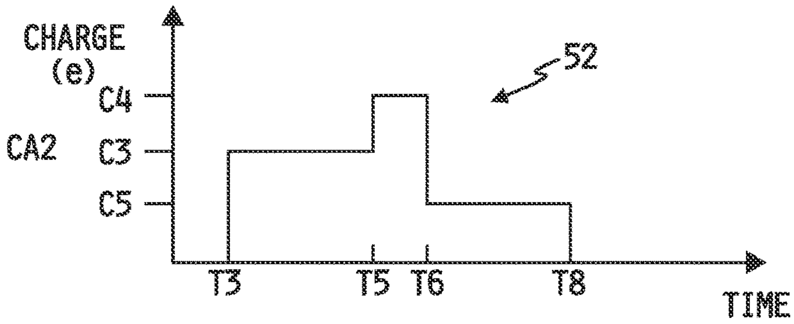
FIG. 6 is a plot of charge magnitude vs. time illustrating an example output of the charge amplifier CA2 as the two example charged particles pass through the second charge detection cylinder disposed in the drift region between the first and third charge detection cylinders during the time window T3-T8 (relative to T0) as depicted in FIGS. 4C-4H.
Figure 4I:
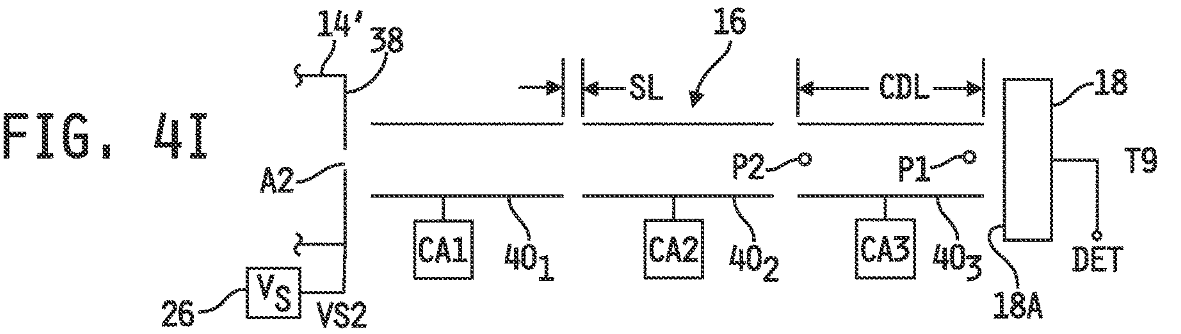
FIG. 4I is a simplified diagram similar to FIGS. 4A-4H illustrating respective positions of the two example charged particles in the field-free drift region at a time T9>T8.
Figure 4J:
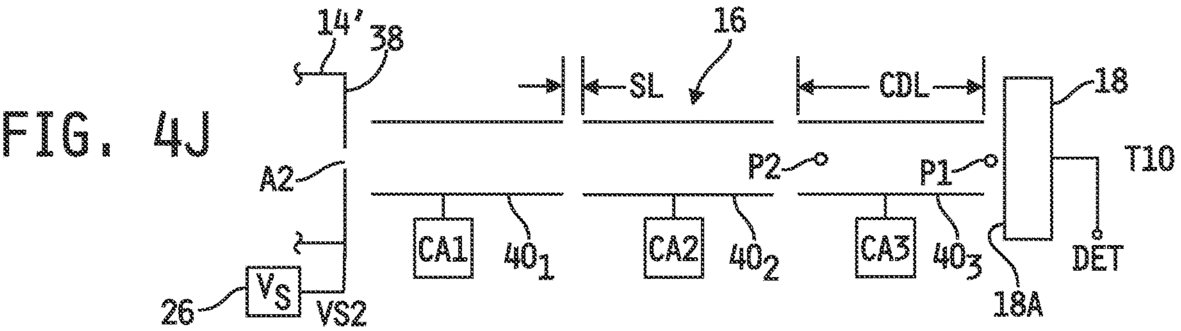
FIG. 4J is a simplified diagram similar to FIGS. 4A-4I illustrating respective positions of the two example charged particles in the field-free drift region at a time T10>T9.
Figure 4K:
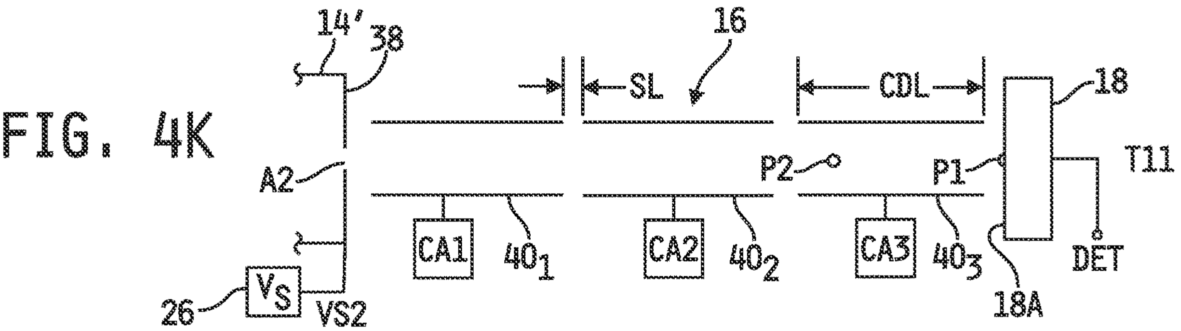
FIG. 4K is a simplified diagram similar to FIGS. 4A-4J illustrating the position of the charged particle P2 in the field-free drift region and illustrating the charged particle P1 reaching the detector at a time T11>T10.
Figure 4L:
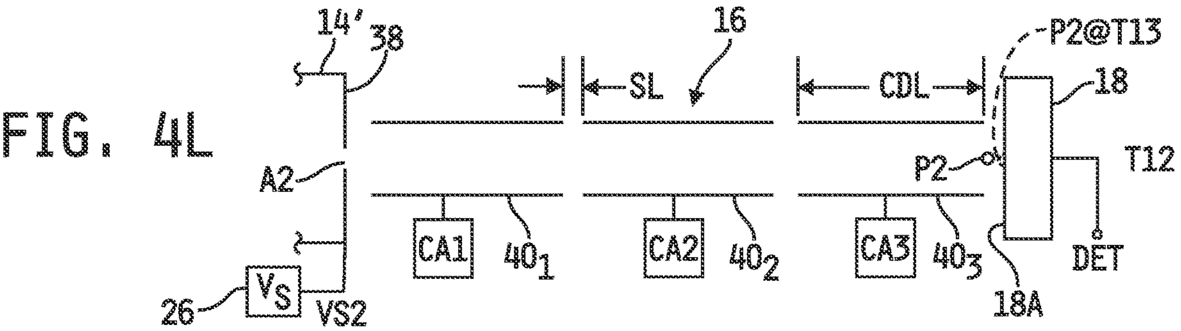
FIG. 4L is a simplified diagram similar to FIGS. 4A-4J illustrating the position of the charged particle P2 in the field-free drift region at a time T12>T11, and further illustrating the charged particle P2 subsequently reaching the detector at a time T13>T12.

Referring now to FIGS. 4A-4L, a simplified example of a portion of the TOF mass spectrometer 10 of FIGS. 1 and 2 is shown which includes three charge detection cylinders $40_1$-$40_3$ axially arranged in the drift region 16 between the ion outlet A2 of the gate 38 of the ion acceleration region 14' and the ion detection face 18A of the ion detector 18. With this simplified mass spectrometer, FIGS. 4A-4L depict two charged particles P1, P2 accelerated into the drift region 16 and drifting successively through each of the three charge detection cylinders $40_1$-$40_3$ as a function of time, wherein P1 has a lower mass-to-charge ratio than that of P2. FIG. 5 depicts an example charge detection signal produced by the first charge amplifier CA1 as the charged particles pass therethrough, and FIGS. 6 and 7 depict the same for the second and third charge amplifiers CA2 and CA3 respectively.

Figure 4A:
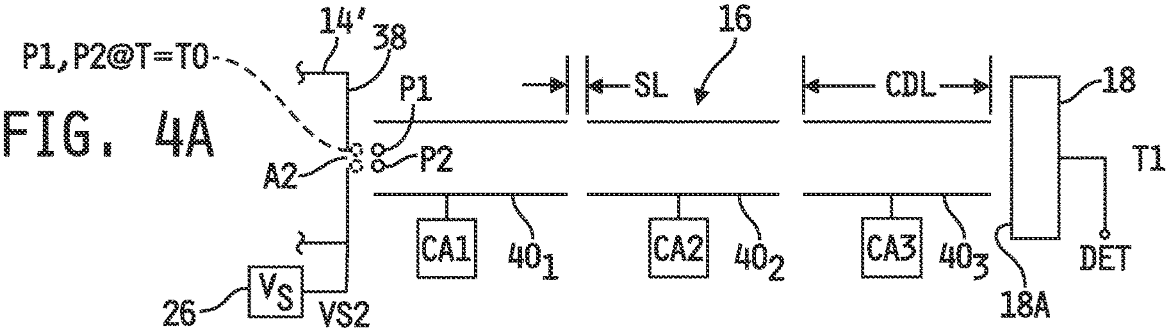
FIG. 4A is a simplified diagram of a portion of an illustrative example of the spectrometer of FIGS. 1 and 2 which includes 3 charge detection cylinders axially arranged in the field-free drift region, and illustrating two example charged particles of different mass-to-charge ratios entering the field-free drift region at a time T1 following acceleration of the charged particles from the acceleration region of the spectrometer at a time T0<T1.

As illustrated in FIG. 4A, the charged particles P1 and P2 are accelerated from the ion acceleration region 14' into the drift region 16 at a reference time T=T0. In this example, the charged particles P1 and P2 both pass through the ion outlet A2 of the ion acceleration region 14' at T=T0 and are understood to begin drifting axially through the drift region at T=T0. As described above with respect to step 104 of the process 100, the processor 28 is operable to record the reference time RT as RT=T0.

Figure 4B:
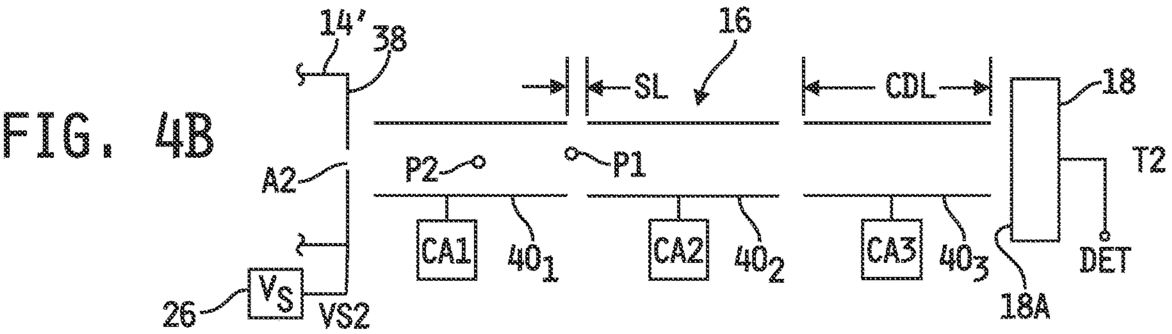
FIG. 4B is a simplified diagram similar to FIG. 4A illustrating respective positions of the two example charged particles in the field-free drift region at a time T2>T1.
Figure 4C:
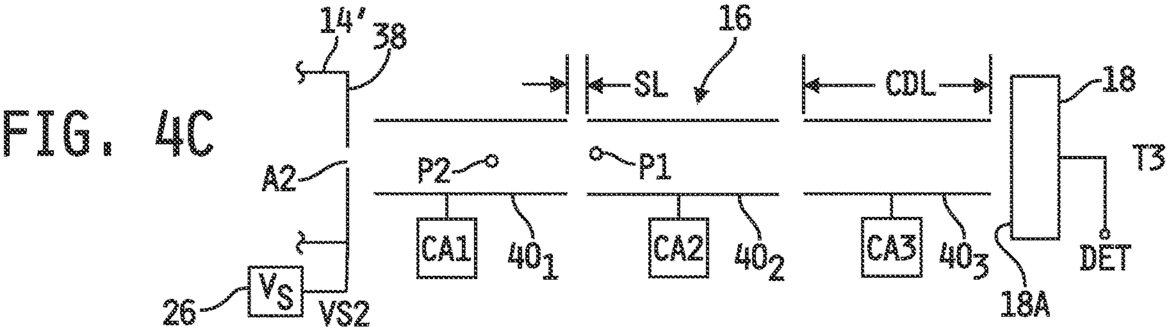
FIG. 4C is a simplified diagram similar to FIGS. 4A and 4B illustrating respective positions of the two example charged particles in the field-free drift region at a time T3>T2.
Figure 4D:
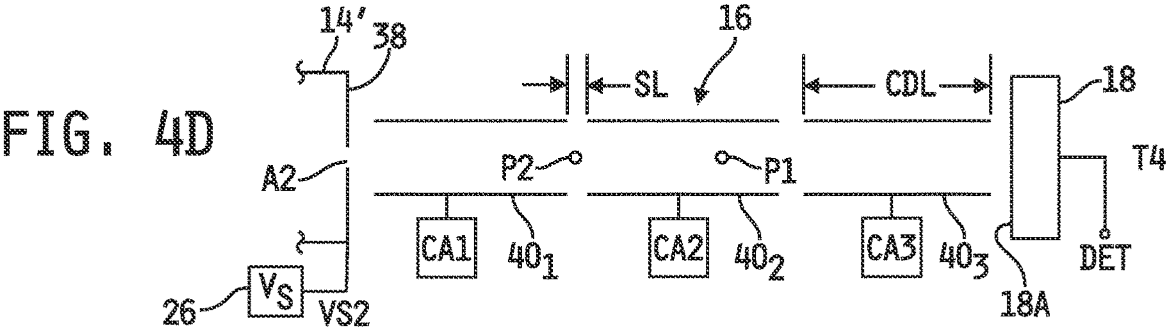
FIG. 4D is a simplified diagram similar to FIGS. 4A-4C illustrating respective positions of the two example charged particles in the field-free drift region at a time T4>T3.

At a subsequent time T1>T0, both of the first and second charged particles P1, P2 enter the first charge detection cylinder $40_1$, as also depicted in FIG. 1. At time T2>T1, the charged particle P1 exits the charge detection cylinder $40_1$ as illustrated in FIG. 4B, and at time T4>T2 the charged particle P2 exits the charge detection cylinder $40_1$ as illustrated in FIG. 4D. Between T1 and T2 in which both of the charged particles P1 and P2 are moving through the charge detection cylinder $40_1$, the charged particles P1 and P2 together induce a charge on the charge detection cylinder $40_1$ of magnitude C1 as depicted in FIG. 5. Thereafter between T2 and T4, the particle P2 alone continues to move through the charge detection cylinder $40_1$ and induces a charge on the charge detection cylinder $40_1$ of magnitude C2 as also depicted in FIG. 5.

As illustrated in FIGS. 4C-4H, the charged particles P1 and P2 enter the second charge detection cylinder $40_2$ at times T3 and T5 respectively, where T5>T4>T3. At time T6>T5, the charged particle P1 exits the charge detection cylinder $40_2$, and at time T8>T6 the charged particle P2 exits the charge detection cylinder $40_2$. With the particle P1 alone moving through the charge detection cylinder $40_2$ between T3 and T5, the charged particle P1 induces a charge on the charge detection cylinder $40_2$ of magnitude C3 as depicted in FIG. 6. Between T5 and T6 in which both of the charged particles P1 and P2 are moving through the charge detection cylinder $40_2$, the charged particles P1 and P2 together induce a charge on the charge detection cylinder $40_2$ of magnitude C4>C3, and between T6 and T8 in which only the charged particle P2 is moving through the charge detection cylinder $40_2$, the charged particle P2 induces a charge on the charge detection cylinder $40_2$ of C5<C3, as also depicted in FIG. 6.

As illustrated in FIGS. 4G-4L, the charged particles P1 and P2 enter the third charge detection cylinder $40_3$ at times T7 and T9 respectively, where T9>T8>T7. At time T10>T9, the charged particle P1 exits the charge detection cylinder $40_3$, and at time T11>T10, the charged particle P1 contacts the detection surface 18A of the ion detector 18. As described above with respect to step 108 of the process 100, the ion detector 18 produces a detection signal upon detection of the charged particle P1 at T=T11, and the processor 28 is operable to record the detection time $DT_{P1}$ of the charged particle P1 as $DT_{P1}$=T11.

At time T12>T11 the charged particle P2 exits the charge detection cylinder $40_3$, and at the time T13>T12, the charged particle P2 contacts the detection face 18A of the ion detector 18. As described above with respect to step 108 of the process 100, the ion detector 18 produces a detection signal upon detection of the charged particle P2 at T=T13, and the processor 28 is operable to record the detection time $DT_{P2}$ of the charged particle P2 as $DT_{P2}$=T13.

Between T7 and T9, the charged particle P1 moving alone through the third charge detection cylinder $40_3$ induces a charge on the charge detection cylinder $40_3$ of magnitude C6 as depicted in FIG. 7. Between T9 and T10 in which both of the charged particles P1 and P2 are moving through the charge detection cylinder $40_3$, the charged particles P1 and P2 together induce a charge on the charge detection cylinder $40_3$ of magnitude C7>C6, and between T10 and T12 during which only the charged particle P2 is moving through the charge detection cylinder $40_3$, the charged particle P2 induces a charge on the charge detection cylinder $40_3$ of C8<C6.

Referring now to FIG. 8, a simplified flowchart is shown illustrating an example process 200 for executing step 112 of the process 100 illustrated in FIG. 3 and described above. The process 200 is illustratively stored in the memory 30 in the form of instructions executable by the processor 28 to carry out the measurements of charge magnitudes or charge states of the charged particles moving through the drift region 16 of the time-of-flight mass spectrometer 10 illustrated in FIGS. 1 and 2. The process 200 illustratively begins at step 202 where the processor 28 is operable to set a counter, i, to 1 or some other constant. Thereafter at step 204, the processor 28 is illustratively operable to process the time-of-flight value $TOF_i$ of the ith charged particle (of a total of M charged particles having passed through the drift region 16 pursuant to the process 100 illustrated in FIG. 3) determined at step 110 of the process 100 along with the dimensional information DI to determine and store in the memory 30 the times or time windows $TW_{i,1\text{-}N}$ during which the ith charged particle was passing through each of the N charge detection cylinders $40_1$-$40_N$ as part of the process 100; e.g., $TW_{i,1\text{-}N}$=F (Dl, $TOF_i$).

In one embodiment, the processor 28 is operable to execute step 204 by first determining the (constant) velocity $v_i$ of the ith charged particle through the drift region 16 according to the relationship $v_i$=DRL/$TOF_i$. With $v_i$ of the ith charged particle now known, the processor 28 is operable to determine the N time windows $TW_{i,1\text{-}N}$ based on the distances between the ion inlet and/or outlet ends of the charge detection cylinders $40_1$-$40_N$ relative to known positions within the drift region, the velocity $f_i$ of the ith charged particle and either or both of the reference time RT and the detection time $DT_i$ of the ith charged particle. As one example, the time window $TW_{i,1}$, corresponding to the time window during which the ith charged particle was passing through the first charge detection cylinder $40_1$, may be determined by the processor 28 relative to the reference time RT according to the relationship $TW_{i,1}$=PRL/$v_i$ through (PRL+CDL)/$v_i$. The time window $TW_{i,2}$, corresponding to the time window during which the ith charged particle was passing through the second charge detection cylinder $40_2$, may likewise be determined by the processor 28 relative to the reference time RT according to the relationship $TW_{i,2}$=(PRL+CDL+SL)/$v_i$ through (PRL+2CDL+SL)/$v_i$, and so on. As another example, the time window $TW_{i,1}$ may be determined by the processor 28 relative to the reference time RT using the detection time of the ith charged particle $DT_i$ according to the relationship $TW_{i,1}=[DT_i-N(CDL+SL)/v_i]$ through $\{DT_i-[(N-1)(CDL)+(N)(SL)]/v_i\}$, and so on. In other embodiments, the processor 28 may be operable to compute the time windows $TW_{i,1\text{-}N}$ relative to the detection time $DT_i$ or relative to a time between RT and $DT_i$. In any case, with each of the time windows $TW_{i,1\text{-}N}$, corresponding to the time windows, relative to RT, $DT_i$ or some reference time therebetween, during which the ith charged particle was passing through each of the N charge detection cylinders $40_1$-$40_N$, determined at step 204, the process 200 advances to steps 206 and 208 to increment the counter i by 1 and re-executed step 204 until the time windows $TW_{1\text{-}M,1\text{-}N}$ of all M of the charged particles has been determined. After completion of the steps 204-208, the memory 30 has stored therein an M×N matrix of time windows $TW_{1\text{-}M,1\text{-}N}$, wherein each of the M rows contains time window data for a respective one of the M charged particles and each of the N columns contains time window data for a respective one of the N charge detection cylinders $40_1$-$40_N$.

Following the YES branch of step 206, the processor 28 is illustratively operable at step 210 to reset the counter i to 1 or some other constant. Thereafter at step 212, the processor 28 is illustratively operable to process the charge detection magnitudes produced by the ith charge amplifier CAi during each time window in the ith column of the time window matrix to match the different charge magnitudes produced by the ith charge amplifier CAi with contributions made thereto by corresponding ones of the M charged particles during the respective time windows. For example, during the time window $TW_{1,i}$ in which the first of the M charged particles was passing through the ith charge detection cylinder $40_i$, the first charged particle induced a charge on the ith charge detection cylinder $40_i$ that is captured in the charge detection signal produced by the ith charge amplifier CAi during the time window $TW_{1,i}$. Likewise, during the time window $TW_{2,i}$ in which the second of the M charged particles was passing through the ith charge detection cylinder 40*i*, the second charged particle induced a charge on the ith charge detection cylinder 40*i* that is captured in the charge detection signal produced by the ith charge amplifier CAi during this time window $TW_{2,i}$. Further still, during any overlap between the time windows $TW_{1,i}$ and $TW_{2,i}$ during which both the first and the second of the M charged particles were passing through the ith charge detection cylinder 40*i*, the first and second charged particles together induced a combined charge on the ith charge amplifier CAi during this time window overlap, and so on. Processing the charge detection signal produced by the ith charge amplifier CAi during the time windows in the ith column of the time window matrix thus produces a set of equations mapping each of the M charged particles and/or various combinations thereof with corresponding charge magnitude values. Following step 212, the process 200 advances to steps 214 and 216 to increment the counter i by 1 and re-executed step 212 until the magnitudes of the charge detection signals produced by each of the N charge amplifiers CA1-CAN have been mapped to corresponding ones and/or various combinations of the M charged particles. After completion of the steps 212-216, the memory 30 has stored therein a system of equations relating each of the M charged particles and/or various combinations thereof to respective charge magnitude values. Following step 216, the processor 28 advances to step 218 to solve this system of equations, or at least a subset thereof, to determine the charge magnitudes $CH_{1\text{-}M}$ of each of the M charged particles or determine the charge magnitudes of at least a subset of the M charged particles. In some embodiments, the processor 28 may be further operable at step 218 to convert one or more of the determined charge magnitude values $CH_{1\text{-}M}$ to charge state values, $CS_{1\text{-}M}$, e.g., according to the relationship $CS_i=CH_i/e$, where e is the elementary charge (constant).

Referring again to the simplified example illustrated in FIGS. 4A-7, the steps of the processes 100 and 200 will now be applied to this example to further elucidate operation of each process via application thereof to a simplified set of charged particles and a simplified mass spectrometer construction. In this simplified example, M=2 (two charged particles P1 and P2) and N=3 (three charge detection cylinders $40_1$-$40_3$ and respective charge amplifiers CA1-CA3). In the following description, the time windows will illustratively be determined relative to the reference time RT as described above, although it will be understood that the time windows may be determined relative to one or more other time events associated with the operation of the mass spectrometer 10, some non-limiting examples of which are described above.

At step 104, the processor 28 is operable to control the voltage source 26 to accelerate P1 and P2 into the drift region 16 at a reference time RT=T0. Thereafter at step 106, the processor 28 is operable to store in the memory samples of the charge detection signals produced by each of the three charge amplifiers CA1-CA3 as the charged particles P1 and P2 drift toward and into the ion detector 18 as illustrated in FIGS. 4A-4L. At step 108, the processor 28 is operable to store in the memory 30 the detection time $DT_{P1}$ of the charged particle P1 by the ion detector 18 as $DT_{P1}$=T11 (see FIG. 4K), and to store in the memory 30 the detection time $DT_{P2}$ of the charged particle P2 by the ion detector 18 as $DT_{P2}$=T13 (see FIG. 4L). Thereafter at step 110, the processor 28 is operable to compute the time of flight $TOF_{P1}$ of the first charged particle P1 as $TOF_{P1}=(DT_{P1}-RT)$, and to compute the time of flight $TOF_{P2}$ of the second charged particle P2 as $TOF_{P2}=(DT_{P2}-RT)$. Thereafter at step 112, the process 200 is executed by the processor 28.

With i=1 at step 204 of the process 200, the processor 28 is operable to first determine the (constant) velocity $v_1$ of the first charged particle P1 through the drift region 16 according to the relationship $v_1=DRL/TOF_{P1}$. Thereafter, the processor 28 is operable at step 204 to determine $TW_{1,1}$ as: PRL/$v_1$=T1 through (PRL+CDL)/$v_1$=T2, or T1 through T2, or using shorthand notation, T1-T2, as depicted in FIGS. 4A and 4B. The processor 28 is thereafter operable at step 204 to determine $TW_{1,2}$ as: (PRL+CDL+SL)/$v_1$=T3 through (PRL+2CDL+SL)/$v_1$=T6, or T3-T6, as depicted in FIGS. 4C-4F. Finally, the processor 28 is operable at step 204 to determine $TW_{1,3}$ as: (PRL+2CDL+2SL)/$v_1$=T7 through (PRL+3CDL+2SL)/$v_1$=T10, or T7-T10, as depicted in FIGS. 4G-4J. Thereafter, the process 200 loops through step 206, increments i to i=2 at step 208 and re-executes step 204 for i=2. With the (constant) velocity $v_2$ of the second charged particle P2 through the drift region 16 determined by the processor 28 according to the relationship $v_2$=DRL/$TOF_{P2}$, the processor 28 proceeds to determine the following time windows $TW_{2,1}$=T1-T4, $TW_{2,2}$=T5-T8 and $TW_{2,3}$=T9-T12 as depicted in FIGS. 4A-4D, 4E-4H and 4I-4L respectively. With i=2=M satisfied at step 206, the process 200 advances to steps 210-216 with the following 2×3 (i.e., M×N) time window matrix TW:

$$TW = \begin{bmatrix} (T1-T2) & (T3-T6) & (T7-T10) \\ (T1-T4) & (T5-T8) & (T9-T12) \end{bmatrix}$$

With i=1 at step 212 of the process 200, the processor 28 is operable to process CA1 for the time windows of column 1 of TW to match or map the magnitude(s) of CA1 to contributions made thereto by P1 and P2 individually and/or collectively. Referring to FIG. 5, it is apparent from the two column 1 time windows $TW_{1,1}$=(T1–T2) and $TW_{2,1}$=(T1–T4), that the magnitude C1 of the charge detection signal CA1 between T1 and T2 is the result of P1 and P2 together inducing a combined charge on the charge detection cylinder $\mathbf{40}_1$, which yields $CH_{P1}$+$CH_{P2}$=C1, where $CH_{P1}$ is the charge magnitude of the charged particle P1 and $CH_{P2}$ is the charge magnitude of the charged particle P2. It is further apparent from the time windows $TW_{1,1}$ and $TW_{2,1}$ that the magnitude of the charge detection signal CA1 between T2 and T4 is the result of P2 alone inducing its charge on the charge detection cylinder $\mathbf{40}_1$, which yields $CH_{P2}$=C2.

The process 200 loops through steps 214 and 216 to increment the counter i to i=2, and the processor 28 is then operable at step 212 to process CA2 for the time windows of column 2 of the TW matrix to match or map the magnitude(s) of CA2 to contributions made thereto by P1 and P2 individually and/or collectively. Referring to FIG. 6, it is apparent from the two column 2 time windows $TW_{1,2}$=(T3–T6) and $TW_{2,2}$=(T5–T8), that the magnitude C3 of the charge detection signal CA1 between T3 and T5 is the result of P1 alone inducing its charge on the charge detection cylinder $\mathbf{40}_2$, which yields $CH_{P1}$=C3. It is further apparent from $TW_{1,2}$ and $TW_{2,2}$ that the magnitude C4 of the charge detection signal CA2 between T5 and T6 is the result of P1 and P2 together inducing a combined charge on the charge detection cylinder $\mathbf{40}_2$, which yields $CH_{P1}$+$CH_{P2}$=C4. Finally, it is apparent from $TW_{1,2}$ and $TW_{2,2}$ that the magnitude C5 of the charge detection signal CA2 between T6 and T8 is the result of P2 alone inducing its charge on the charge detection cylinder $\mathbf{40}_2$, which yields $CH_{P2}$=C5.

The process 200 again loops through steps 214 and 216 to increment the counter i to i=3, and the processor 28 is then operable at step 212 to process CA3 for the time windows of column 3 of the TW matrix to match or map the magnitude(s) of CA3 to contributions made thereto by P1 and P2 individually and/or collectively. Referring to FIG. 7, it is apparent that, in similar fashion to the operation of step 212 with respect to CA2, the three magnitudes C6, C7 and C8 of CA3 yield the results $CH_{P1}$=C6, $CH_{P1}$+$CH_{P2}$=C7 and $CH_{P2}$=C8. Thus, following the YES branch of step 214 the process 200 proceeds to step 218 with the following system of equations:

$$C1=CH_{P1}+CH_{P2}$$

$$C2=CH_{P2}$$

$$C3=CH_{P1}$$

$$C4+CH_{P1}+CH_{P2}$$

$$C5=CH_{P2}$$

$$C6=CH_{P1}$$

$$C7=CH_{P1}+CH_{P2}$$

$$C8=CH_{P2}$$

At step 218, the processor 28 is operable to solve the foregoing system of equations for $CH_{P1}$ and $CH_{P2}$. The processor 28 may be programmed to solve the foregoing system of equations using any conventional mathematical technique. As one example, the processor 28 may be programmed to solve the system of equations in the example of FIGS. 4A-7 by computing $CH_{P1}$ and $CH_{P2}$ each as an algebraic average of their individual measurements, and then modifying either or both of these values, if at all, to satisfy the individual as well as combined measurements. Thus, for example, the processor 28 may be operable at step 218 to determine $CH_{P1}$ and $CH_{P2}$ in the example according to the relationships $CH_{P1}$=(C3+C6)/2 and $CH_{P2}$=(C2,+C5+C8)/3, and to then modify $CH_{P1}$ and/or $CH_{P2}$ to satisfy these two equations as well as the equation $CH_{P1}$+$CH_{P2}$=(C1+C4+C7)/3. It will be understood that in alternate embodiments, the processor 28 may be programmed to execute step 218 by solving the system of equations resulting from steps 210-216 using any one or combination of conventional mathematical equation solving techniques and/or using any one or combination of conventional data fitting techniques, examples of which may include, but are not limited to, one or more regression analysis techniques such as least squares or other regression techniques, one or more iterative techniques such as Runge-Kutta or other iterative techniques, or the like.

Returning again to the process 100 of FIG. 3 to complete the example, the processor 28 is operable at step 114 to compute the mass-to-charge ratios of the two charged particles P1 and P2 each as a conventional function of their respective measured times-of-flight $TOF_{P1}$ and $TOF_{P2}$, of the length DRL of the drift region 16 and of a potential U relating to the magnitude(s) of the voltages VS1, VS2 to accelerate the charged particles from the ion acceleration region 14' into the drift region 16, such that $m/z_{P1}$=F ($TOF_{P1}$, DRL, U) and $m/z_{P2}$=F ($TOF_{P2}$, DRL, U). Thereafter at step 16, the processor 28 is operable to compute the masses $m_{P1}$ and $m_{P2}$ of the charged particles P1 and P2 respectively according to the relationships $m_{P1}$=($m/z_{P1}$)($CH_{P1}$) and $m_{P2}$=($m/z_{P2}$)($CH_{P2}$).

It will be understood that the examples illustrated in FIGS. 4A-7 are provided only for the purpose of describing example operation of a simplified time-of-flight mass spectrometer of the type illustrated in FIGS. 1 and 2, and are not intended to be limiting in any way. Those skilled in the art will appreciate that the above-described process, or variant thereof, may be applied directly to the determination of mass-to-charge ratios, charge magnitudes and/or charge states and mass values of many charged particles, e.g., hundreds or thousands or more. Alternatively, those skilled in the art will recognize other techniques for determining the magnitudes and/or charge states of the multiple charged particles based on one or more of the charge detection signals produced by the charge amplifiers CA1-CAN, and it will be understood that any such other techniques are intended to fall within the scope of this disclosure.

It will be further understood that in the mass spectrometer 10 illustrated in FIG. 1, not all of the charge detection signals may be used to determine particle charge values. In some embodiments in which charged particles may be bunched together exiting the ion processing region 14, for example, the charge detection signals produced by the first one or several charge amplifiers may be ignored by the processor 28. Alternatively or additionally, the drift tube 16A may be configured to include the pre-array space 16B of any desired length to allow such bunched particles to at least begin to separate in the axial direction of the drift region 16 prior to passing through the first of multiple charge detection cylinders $\mathbf{40}_1$-$\mathbf{40}_N$ as described above.

Figure 9:
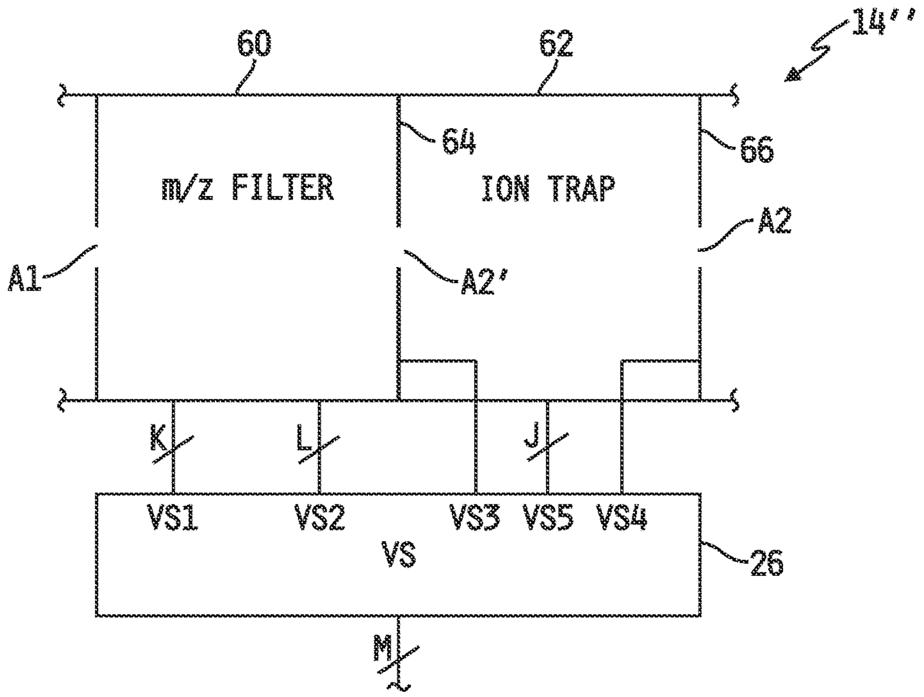
FIG. 9 is a simplified diagram the ion processing region of the spectrometer of FIG. 1 embodied in the form of a mass-to-charge ratio filter, and optionally an ion trap, to configure the spectrometer of FIG. 1 as an embodiment of a mass-to-charge ratio scannable mass spectrometer.

Referring now to FIG. 9, another embodiment 14" of the ion processing region 14 is shown implemented in the form of a conventional mass-to-charge ratio filter (m/z filter) 60 followed by a conventional ion trap 62. In the embodiment illustrated in FIG. 9, one end of the mass-to-charge ratio filter 60 defines the ion inlet A1 of the ion processing region 14" and an ion exit end of the ion trap 62 defines the ion outlet A2 of the ion processing region 14". The mass-to-charge ratio (m/z) filter 60 is conventional and may illustratively be implemented in the form of a quadrupole or other instrument operatively coupled to the voltage source 26. In the illustrated embodiment, for example, an output voltage VS1 of the voltage source 26 is operatively coupled to the m/z filter 60 via a number, K, of signal paths where K may be any positive integer, and another output voltage VS2 of the voltage source 26 is likewise operatively coupled to the m/z filter 60 via a number, L, of signal paths where L may be any positive integer. In some embodiments, VS1 is a time-varying voltage signal of selectable frequency and peak magnitude supplied to the m/z filter 60 in the form of a pair of opposite-phase voltages, e.g., 180 degrees out of phase with each other, and VS2 is a constant, e.g., DC, voltage of selectable magnitude. In such embodiments, the processor 28 is illustratively programmed or programmable to control the output voltages VS1 and VS2 in a conventional manner to create field conditions within the m/z filter 60 selected to pass through the m/z filter 60 only ions having mass-to-charge ratios of a selected mass-to-charge ratio or within a selected range of mass-to-charge ratios. In some alternate embodiments, only VS1 is applied to the m/z filter 60 and controlled by the processor 28 to create field conditions within the m/z filter 60 selected to pass through the m/z filter 60 only ions having mass-to-charge ratios above a threshold mass-to-charge ratio.

In the embodiment illustrated in FIG. 9, the ion trap 62 is likewise conventional and may illustratively be implemented in the form of a quadrupole, hexapole or other instrument with an inlet gate 64, e.g., in the form of a conventional end cap, defining an ion inlet A2' of the ion trap 62 and an outlet gate 66, e.g., in the form of another conventional end cap, defining the ion outlet A2 of the ion processing region 14". In the illustrated embodiment, an output voltage VS3 of the voltage source 26 is operatively coupled to the inlet end cap 64, an output voltage VS4 of the voltage source 26 is operatively coupled to the outlet end cap 66 and an output voltage VS5 is operatively coupled to the body of the ion trap 62 via a number, J, of signal paths where J may be any positive integer. In some embodiments, VS3 and VS4 are switchable DC voltages with selectable magnitudes, and VS5 is a time-varying voltage signal of selectable frequency and peak magnitude supplied to the ion trap 62 in the form of a pair of opposite-phase voltages, e.g., 180 degrees out of phase with each other. In such embodiments, the processor 28 is illustratively programmed or programmable to control the output voltages VS3-VS5 in a conventional manner to selectively pass charged particles into the ion trap 62 via the ion inlet A2', to confine charged particles within the ion trap 62 and to selectively eject confined ions from the ion trap 62 through the ion outlet A2. In some alternative embodiments, the m/z filter 60 and the ion trap 62 may be merged into a single instrument, e.g., in the form of a conventional quadrupole mass-to-charge ratio filter with end caps. In any case, the resulting mass spectrometer 10 is illustratively controllable to operate as a single mass-to-charge ratio mass spectrometer, a single range of mass-to-charge ratios mass spectrometer and/or a mass-to-charge ratio scanning mass spectrometer. In any mode of operation, however, the mass spectrometer 10 is configured to determine particle mass-to-charge ratios, particle charge magnitudes or charge states and particle mass values.

Figure 10:
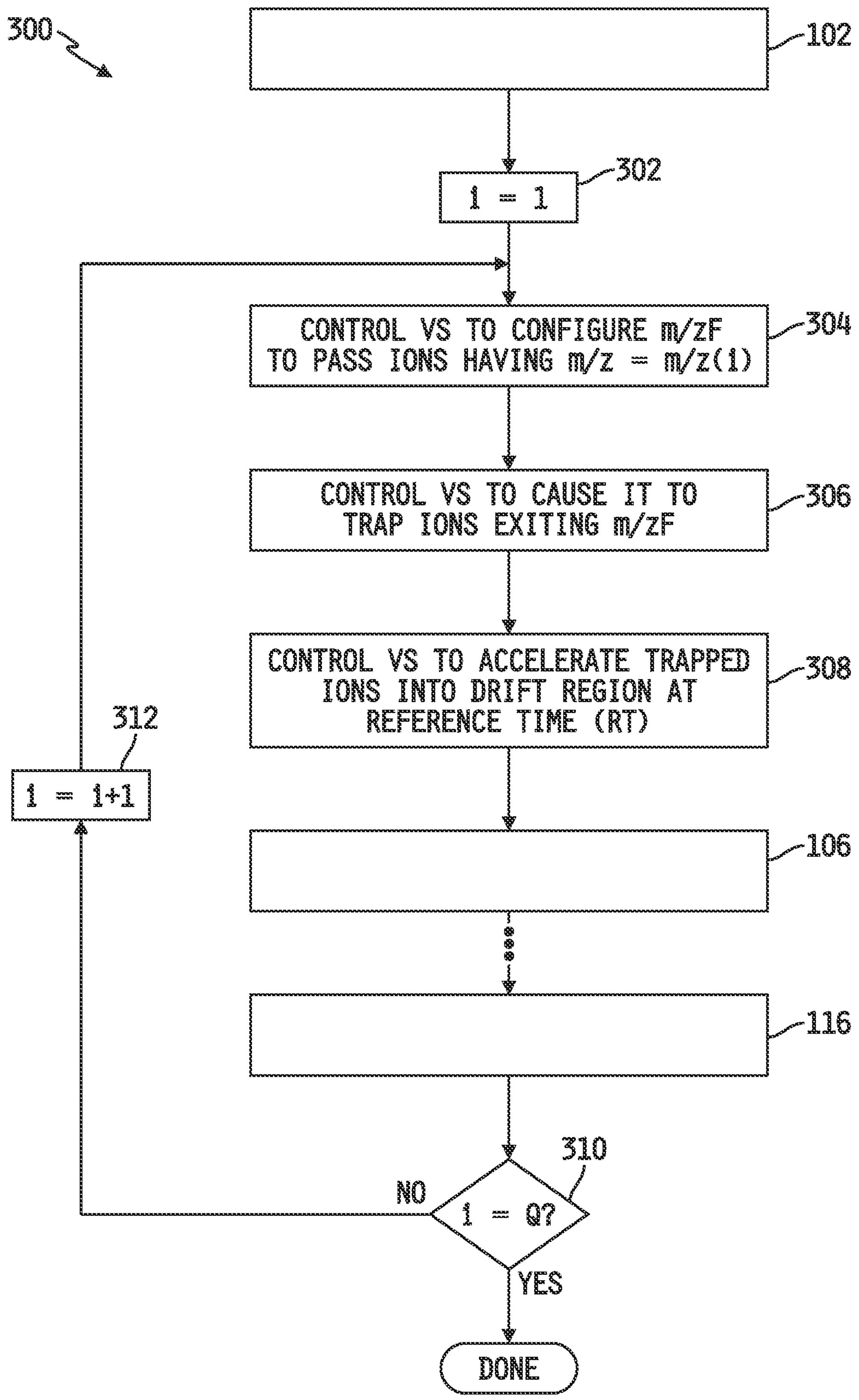
FIG. 10 is a flowchart illustrating an embodiment of a simplified process for operating the mass-to-charge ratio scannable mass spectrometer of FIGS. 1 and 9 to measure ions as a function of mass-to-charge ratio and to measure the charges of the ions as they separate in a field-free drift region of the instrument.

Referring now to FIG. 10, a simplified flowchart is shown depicting an example process 300 for operating the mass spectrometer of FIGS. 1 and 9 (i.e., the mass spectrometer 10 of FIG. 1 with the ion processing region 14" of FIG. 9 implemented as the ion processing region 14) to measure ion mass-to-charge ratio, ion charge (magnitude and/or charge state) and ion mass. The process 300 is illustratively stored in the memory 30 in the form of instructions executable by the processor 28 to carry out the measurements of particle mass-to-charge ratio, particle charge and particle mass. The process 300 illustratively starts at a point at which one or more charged particles have been generated by the ion generator 20 and are advanced toward and through the ion processing region 14" via an ion accelerating structure and/or pressure differential conditions established in or as part of the ion source region 12. The process 300 illustratively includes many of the steps of the process 100, and like steps are therefore identified with like numbers and operation of the processor 28 during such steps will be as described above with respect to FIG. 3.

The process 300 illustratively begins step 102 of the process 100 where the drift region dimensional information (DI) is stored in the memory 30. Thereafter at step 302, the processor 28 is operable to set a counter i=1 or some other constant. Thereafter at step 304, the processor 28 is illustratively operable to control the voltage source 26 to configure the m/z filter 60 to pass therethrough only ions having a first selected mass-to-charge ratio $m/z_i$ or having mass-to-charge ratios within a first selected range i of mass-to-charge ratios. Thereafter at step 306, the processor 28 is illustratively operable to control the voltage source 26 to control or configure the ion trap 62 to collect and trap therein charged particles exiting the m/z filter 60. Illustratively, the processor 28 is operable to maintain such control of the ion trap 62 for a predefined time period in order to collect multiple charged particles therein. The predefined time period may vary for different applications and/or for different samples 22. In any case, after expiration of the predefined time period in which the processor 28 is operable to maintain such control of the ion trap 62, the process 300 advances to step 308 where the processor 28 is operable to control the voltage source 26 to accelerate the trapped charged particles from the ion trap 62. Such control is illustratively accomplished by suitably switching the DC voltage(s) applied to either or both of the gates 64, 66, and in any case establishes a reference time RT at which the charged particles released from the ion trap 62 begin drifting through the drift region 16 of the mass spectrometer 10. Following step 308, the processor 28 is illustratively operable to execute steps 106-116 of the process 100 illustrated in FIG. 3 to determine the mass-to-charge ratios, charge magnitudes or charge states and mass values of the charged particles drifting through the drift region 16, all as described above.

In some embodiments in which the m/z filter 60 is controlled to selectively pass charged particles of a selected mass-to-charge ratio or to pass charged particles with mass-to-charge ratios within a very narrow range of mass-to-charge ratio values, the mass-to-charge ratios of the charged particles drifting through the drift region 16 will be known and need not be computed at step 114 such that step 114 may be omitted. In some such embodiments, however, step 114 may be included to provide additional mass-to-charge ratio information, e.g., for use in calibrating the m/z filter 60 and/or to provide for improved mass-to-charge ratio resolution. In any case, the process 300 advances from step 116 to step 310 where the processor 28 is operable to compare the counter i to a count value Q. If $i<Q$, the process 300 advances to step 312 to increment the counter i at step 312 and to loop back to step 304 to control the voltage source 26 to configure the m/z filter 60 to pass therethrough only ions having a second selected mass-to-charge ratio $m/z_i$ or having mass-to-charge ratios within a second specified range i of mass-to-charge ratios, wherein the second selected mass-to-charge ratio or second selected range of mass-to-charge ratios is incrementally different, e.g., greater or lesser than the first. If, at step 310, $i=Q$, then the range of mass-to-charge ratios has been scanned and processed, and the process 300 is complete. The value Q and the incremental step size in the selected mass-to-charge ratios or selected ranges of mass-to-charge ratios may illustratively be selected so as to scan any desired range of mass-to-charge ratio values.

In alternate embodiments in which the m/z filter 60 and the ion trap 62 are combined into a single instrument as described above, the process 300 may accordingly be modified to combine steps 304 and step 306 into a single step in which the processor 28 is operable to control the voltage source 26 to configure the combined instrument to trap therein only ions of $m/z_i$, or to combine steps 306 and 308 into a single step in which the processor 28 is operable to control the voltage source 26 to expel from the combined instrument only ions of $m/z_i$. In some alternate embodiments, the ion trap 62 may be omitted such that the charged particles exiting the m/z filter 60 pass directly into the drift region 16. However, in such embodiments an ion acceleration region will be included in the ion source region 12 to establish the reference time RT, and the dimensional information DI will include the dimensional information of the m/z filter 60 in at least the axial direction as the m/z filter 60 will, in such embodiments, become part of the drift region.

Figure 11:
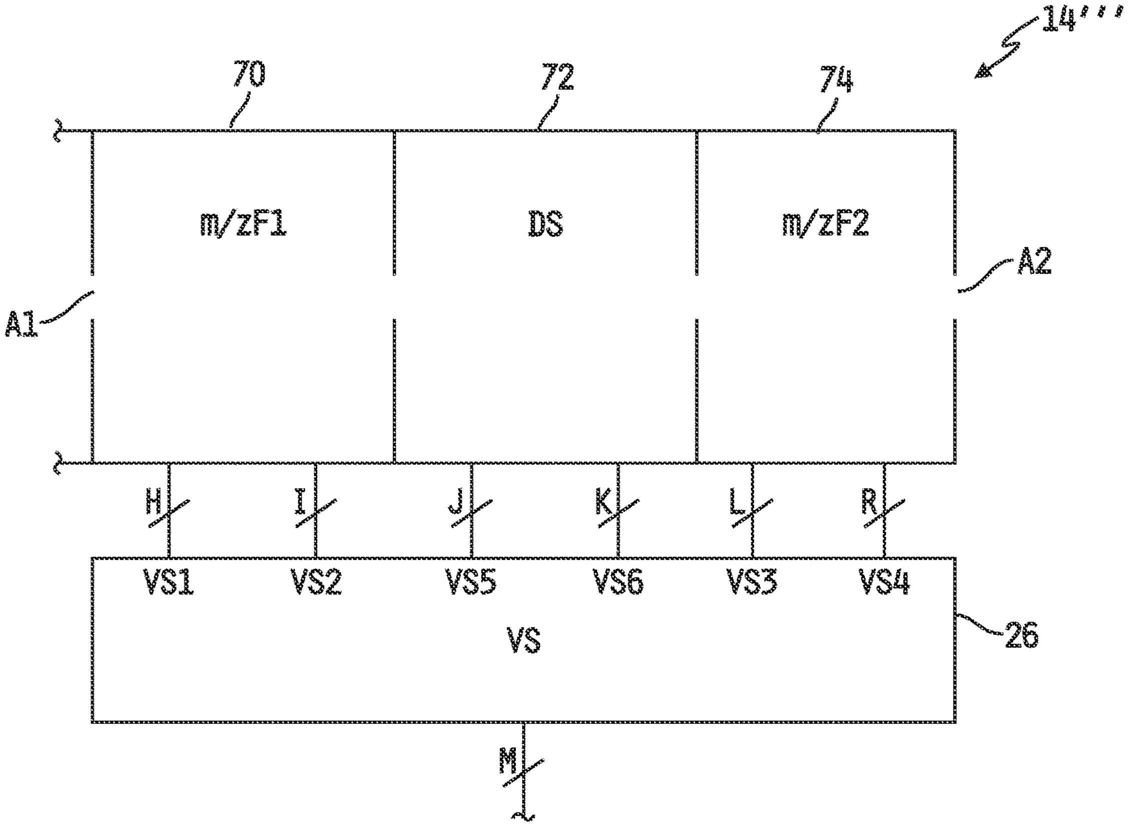
FIG. 11 is a simplified diagram of the ion processing region of the spectrometer of FIG. 1 embodied in the form of two mass-to-charge ratio filters separated by an ion dissociation region, to configure the spectrometer of FIG. 1 as another embodiment of a mass-to-charge ratio scannable mass spectrometer.

Referring now to FIG. 11, another embodiment 14''' of the ion processing region 14 is shown implemented in the form of two conventional mass-to-charge ratio filters (m/z filter) 70, 74 with a dissociation stage 72 disposed therebetween. In the embodiment illustrated in FIG. 11, one end of the mass-to-charge ratio filter 70 defines the ion inlet A1 of the ion processing region 14''' and an ion exit end of the mass-to-charge ratio filter 74 defines the ion outlet A2 of the ion processing region 14'''. The mass-to-charge ratio (m/z) filters 70, 74 are conventional and may each illustratively be implemented in the form of a quadrupole or other instrument operatively coupled to the voltage source 26, and the dissociation stage 72 is likewise conventional and, in the illustrated embodiment, operatively coupled to the voltage source 26.

In the illustrated embodiment an output voltage VS1 of the voltage source 26 is operatively coupled to the m/z filter 70 via a number, H, of signal paths where H may be any positive integer, and another output voltage VS2 of the voltage source 26 is likewise operatively coupled to the m/z filter 70 via a number, I, of signal paths where I may be any positive integer. Another output voltage VS3 of the voltage source 26 is operatively coupled to the m/z filter 74 via a number, L, of signal paths where L may be any positive integer, and another output voltage VS4 of the voltage source 26 is likewise operatively coupled to the m/z filter 74 via a number, R, of signal paths where R may be any positive integer. In some embodiments, VS1 and VS3 are time-varying voltage signals of selectable frequency and peak magnitude supplied to the m/z filters 70 and 74 respectively in the form of a pair of opposite-phase voltages, e.g., 180 degrees out of phase with each other, and VS2 and VS4 are constant, e.g., DC, voltages of selectable magnitude. In such embodiments, the processor 28 is illustratively programmed or programmable to control the output voltages VS1-VS4 in a conventional manner to create field conditions within the m/z filters 70, 74 selected to pass through the m/z filter 70, 74 only ions having mass-to-charge ratios of selected mass-to-charge ratios or within selected ranges of mass-to-charge ratios. In some alternate embodiments, only VS1 is applied to the m/z filter 70 and controlled by the processor 28 to create field conditions within the m/z filter 70 selected to pass through the m/z filter 70 only ions having mass-to-charge ratios above a threshold mass-to-charge ratio. Alternatively or additionally, only VS3 may be applied to the m/z filter 74 and controlled by the processor 28 to create field conditions within the m/z filter 74 selected to pass through the m/z filter 74 only ions having mass-to-charge ratios above a threshold mass-to-charge ratio.

In the embodiment illustrated in FIG. 11, the voltage source 26 is shown as being operatively coupled via two voltage outputs VS5 and VS6 to the dissociation stage 72. It will be understood that such voltage source connections are included only in embodiments in which the dissociation stage 72 is implemented in the form of a device or instrument that is controllable by one or more voltage signals to dissociate, e.g., fragment, charged particles. In such embodiments, VS5 may be a time-varying voltage signal of selectable frequency and peak magnitude, and VS6 may be a constant, e.g., DC, voltages of selectable magnitude. In some such embodiments the voltage source 26 may produce only VS5, and in others the voltage source 26 may produce only VS6. In other embodiments, the dissociation stage 72 may not be connected at all to the voltage source 26 and may instead be coupled only to one or more sources of gas (not shown), wherein the dissociation stage 72 is operable to dissociate, e.g., fragment, charged particles via collisions with one or more gasses provided by the one or more sources of gas. In any case, the resulting mass spectrometer 10 is illustratively controllable to operate as a single mass-to-charge ratio mass spectrometer, a single range of mass-to-charges ratios mass spectrometer, a single mass-to-charge ratio scanning mass spectrometer (e.g., scanning a range of mass-to-charge ratios with the m/z filter 70 or the m/z filter 74) and/or a double mass-to-charge ratio scanning mass spectrometer (e.g., scanning ranges of mass-to-charge ratios with both the m/z filter 70 and the m/z filter 74). In any mode of operation, however, the mass spectrometer 10 is configured to determine particle mass-to-charge ratios, particle charge magnitudes or charge states and particle mass values.

Figure 12:
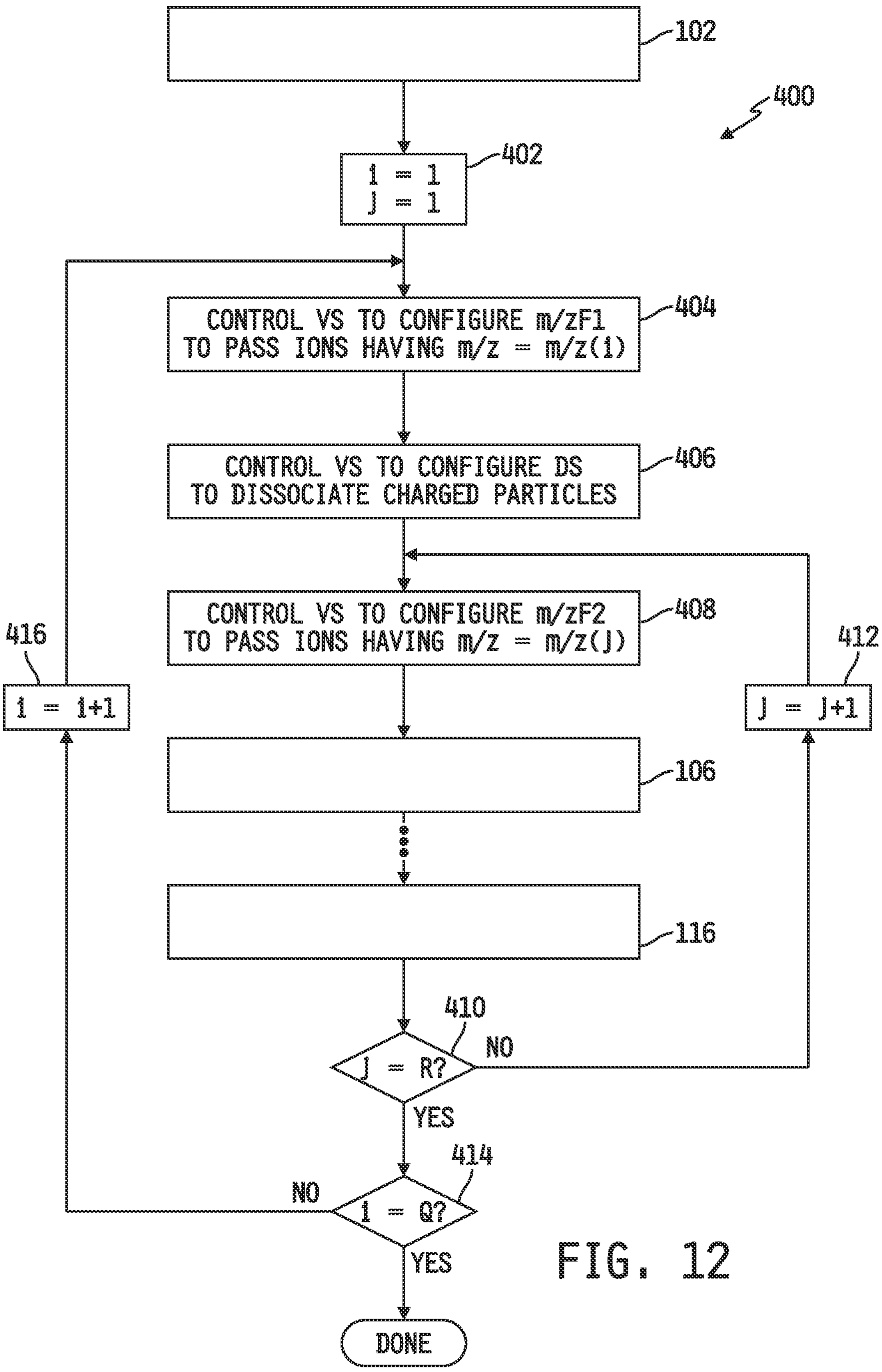
FIG. 12 is a flowchart illustrating an embodiment of a simplified process for operating the mass-to-charge ratio scannable mass spectrometer of FIGS. 1 and 11 to measure ions as a function of mass-to-charge ratio and to measure the charges of the ions as they separate in a field-free drift region of the instrument.

Referring now to FIG. 12, a simplified flowchart is shown depicting an example process 400 for operating the mass spectrometer of FIGS. 1 and 11 (i.e., the mass spectrometer 10 of FIG. 1 with the ion processing region 14''' of FIG. 11 implemented as the ion processing region 14) to measure ion mass-to-charge ratio, ion charge (magnitude and/or charge state) and ion mass. The process 400 is illustratively stored in the memory 30 in the form of instructions executable by the processor 28 to carry out the measurements of particle mass-to-charge ratio, particle charge and particle mass. Like the process 300, the process 400 illustratively starts at a point at which one or more charged particles have been generated by the ion generator 20 and are advanced toward and through the ion processing region 14''' via an ion accelerating structure and/or pressure differential conditions established in or as part of the ion source region 12. The process 400 illustratively includes many of the steps of the process 100, and like steps are therefore identified with like numbers and operation of the processor 28 during such steps will be as described above with respect to FIG. 3.

The process 400 illustratively begins step 102 of the process 100 where the drift region dimensional information (DI) is stored in the memory 30. Thereafter at step $40_2$, the processor 28 is operable to set two counters i=1 and j=1 or some other constant(s). Thereafter at step 404, the processor 28 is illustratively operable to control the voltage source 26 to configure the m/z filter 70 to pass therethrough only ions having a first selected mass-to-charge ratio $m/z_i$ or having mass-to-charge ratios within a first selected range of mass-to-charge ratios. Thereafter at step 406, the processor 28 is illustratively operable to control the voltage source 26 to configure the dissociation stage 72 to dissociate, e.g., fragment, the charged particles exiting the m/z filter 70. In embodiments in which the voltage source 26 does not operable control the dissociation stage 72, step 406 may be omitted or replaced by a suitable control step for controlling gas flow or other control feature of the dissociation region 72. Thereafter at step 408, the processor 28 is illustratively operable to control the voltage source 26 to configure the m/z filter 74 to pass therethrough only those of the dissociated ions exiting the dissociation stage having a first selected mass-to-charge ratio $m/z_j$ or having mass-to-charge ratios within a first selected range j of mass-to-charge ratios.

In some embodiments, the m/z filter 74 may be configured in a conventional manner to include an ion trapping feature as described above with respect to the m/z filter 60 of FIG. 9, and in such embodiments the processor 28 may be further operable at step 408 to control the voltage source 26 to collect and trap charged particles within the m/z filter 74 for some time period, and to then control the voltage source 26 to accelerate the trapped charged particles from the m/z filter 74 which establishes a reference time RT at which the charged particles released from the m/z filter 74 begin drifting through the drift region 16 of the mass spectrometer 10. In embodiments of the m/z filter 74 which do not include such an ion trapping feature, an ion acceleration region will be included in the ion source region 12 to establish the reference time RT, and the dimensional information DI will include the dimensional information of the m/z filters 70, 74 and the dissociation stage 72 in at least the axial direction as the m/z filters 70, 74 and the dissociation stage 72 will, in such embodiments, become part of the drift region 16. In other such embodiments, an ion acceleration stage, e.g., in the form of a conventional ion trap or other ion acceleration stage, may be included as part of the dissociation stage 72 or be inserted into the mass spectrometer 10 between the dissociation stage 72 and the m/z filter 74 for the purpose of collecting multiple charged particles and establishing the reference time RT. In still other such embodiments, a conventional ion trap or other ion acceleration stage may be inserted into the mass spectrometer 10 between the m/z filter 74 and the drift region 16, as illustrated by example in the embodiment of the ion processing region 14' depicted in FIG. 9, for the purpose of collecting multiple charged particles and establishing the reference time RT.

Following step 408, the processor 28 is illustratively operable to execute steps 106-116 of the process 100 illustrated in FIG. 3 to determine the mass-to-charge ratios, charge magnitudes or charge states and mass values of the charged particles drifting through the drift region 16, all as described above. In some embodiments in which the m/z filter 74 is controlled to selectively pass charged particles of a selected mass-to-charge ratio or to pass charged particles with mass-to-charge ratios within a very narrow range of mass-to-charge ratio values, the mass-to-charge ratios of the charged particles drifting through the drift region 16 will be known and need not be computed at step 114 such that step 114 may be omitted. In some such embodiments, however, step 114 may be included to provide additional mass-to-charge ratio information, e.g., for use in calibrating the m/z filter 74 and/or to provide for improved mass-to-charge ratio resolution. In any case, the process 400 advances from step 116 to step 410 where the processor 28 is operable to compare the counter j to a count value R. If j<R, the process 400 advances to step 412 to increment the counter j at step 412 and to loop back to step 408 to control the voltage source 26 to configure the m/z filter 74 to pass therethrough only ions having a second selected mass-to-charge ratio $m/z_j$ or having mass-to-charge ratios within a second specified range j of mass-to-charge ratios, wherein the second selected mass-to-charge ratio or second selected range of mass-to-charge ratios is incrementally different, e.g., greater or lesser than the first.

If, at step 410, j=R, then the range of mass-to-charge ratios has been scanned by the m/z filter 74 and processed, and the process 400 advances to step 414 wherein the processor 28 is operable to compare the counter i to a count value Q. If i<Q, the process 400 advances to step 416 to increment the counter i at step 416 and to loop back to step 404 to control the voltage source 26 to configure the m/z filter 74 to pass therethrough only ions having a second selected mass-to-charge ratio m/z; or having mass-to-charge ratios within a second specified range i of mass-to-charge ratios, wherein the second selected mass-to-charge ratio or second selected range of mass-to-charge ratios is incrementally different, e.g., greater or lesser than the first. If, at step 414, i=Q, then the range of mass-to-charge ratios has been scanned by the m/z filter 70 and processed, and the process 400 is complete. The values R and Q, as well as the incremental step sizes in the selected mass-to-charge ratios or selected ranges of mass-to-charge ratios, may illustratively be selected so as to scan any desired range of mass-to-charge ratio values.

Referring now to FIGS. 13-15, an embodiment is shown of the drift region 16 of the mass spectrometer 10 which may be implemented in any of the forms of the mass spectrometer described above. In the illustrated embodiment, the drift tube 16A is provided in the form of an elongated sheet of flexible or semi-flexible, electrically insulating material, e.g., a flexible circuit board material, to which a plurality of spaced-apart, parallel, electrically conductive strips are attached or upon which a plurality of spaced-apart, parallel, electrically conductive strips are formed in a conventional manner, e.g., using conventional metallic pattern deposition techniques. In this embodiment, the electrically conductive strips are illustratively oriented so when opposite sides of the flexible or semi-flexible sheet are brought together to form an elongated cylinder, e.g., as illustrated in FIG. 14, the plurality of spaced-apart, parallel, electrically conductive strips form the plurality of charge detection cylinders $\mathbf{40}_1$-$\mathbf{40}_N$ and the one or more ground rings $\mathbf{42}_1$-$\mathbf{42}_N$. In some alternate embodiments, one or more, or all, of the ground rings $\mathbf{42}_1$-$\mathbf{42}_N$ may be omitted. Those skilled in the art will recognize other forms in which the drift tube 16A and/or the charge detection cylinders $\mathbf{40}_1$-$\mathbf{40}_N$ and/or the one or more ground rings $\mathbf{42}_1$-$\mathbf{42}_N$ (in embodiments which include them) may be provided, and it will be understood the any such other forms are intended to fall within the scope of this disclosure.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, while several structures are illustrated in the attached figures and are described herein as being controllable and/or configurable to establish one or more electric fields therein configured and oriented to accelerate and/or otherwise operate on charged particles, those skilled in the art will recognize that acceleration of and/or other operation on charged particles may, in some cases, be alternatively or additionally accomplished via one or more magnetic fields. It will be accordingly understood that any conventional structures and/or mechanisms for substituting or enhancing one or more of the electric fields described herein with one or more suitable magnetic fields are intended to fall within the scope of this disclosure. As another example, whereas the various embodiments of the drift tube 16A are illustrated in the attached figures and described herein as being generally linear structures, i.e., linear drift tubes, it will be understood that the concepts described herein are directly applicable to drift tubes of other shapes and configurations, examples of which include, but are not limited to, a V-shaped drift tube as conventionally implemented in reflectron time-of-flight mass spectrometer, a W-shaped drift tube as conventionally implemented in multireflectron time-of-flight mass spectrometers, an L-shaped drift tube, or the like. No limitation is intended with respect to the shape of the drift tube 16A, and none should be inferred.

What is claimed is:

1. A mass spectrometer, comprising:
- an ion source region including an ion generator configured to generate ions from a sample,
- an ion detector configured to detect ions and produce corresponding ion detection signals,
- an electric field-free drift region disposed between the ion source region and the ion detector through which the generated ions drift axially toward the ion detector,
- a plurality of spaced-apart charge detection cylinders disposed in the drift region and through which the ions drifting axially through the drift region pass, and
- a plurality of charge amplifiers each coupled to a different one of the plurality of charge detection cylinders and each configured to produce a charge detection signal corresponding to a magnitude of charge of one or more of the generated ions passing through a respective one of the plurality of charge detection cylinders.

2. The mass spectrometer of claim 1, further comprising:
- an ion region or instrument disposed between the ion source region and the drift region, and
- at least one voltage source electrically connected to the ion region or instrument and configured to selectively produce at least one voltage to establish an electric field within the ion region or instrument oriented to accelerate the generated ions into the field-free drift region.

3. The mass spectrometer of claim 2, further comprising:
- at least one processor, and
- at least one memory having instructions stored therein executable by the processor to control the at least one voltage source to produce the at least one voltage to establish the electric field within the ion region or instrument.

4. The mass spectrometer of claim 3, wherein the instructions stored in the at least one memory further includes instructions executable by the processor to:
- (a) control the at least one voltage source to produce the at least one voltage to establish the electric field within the ion acceleration region at a reference time RT,
- (b) store in the at least one memory samples of the charge detection signals produced by each of the plurality of charge amplifiers as the accelerated ions drift axially through the field-free drift region toward the ion detector,
- (c) monitor the ion detector and store detection times (DT) by the ion detector of each of the at least a subset of the accelerated ions,
- (d) determine times-of-flight (TOF) of the at least a subset of the accelerated ions through the drift region each based on a respective one of the detection times DT relative to RT, and
- (e) determine charge magnitudes or charge states of each of the at least a subset of the accelerated ions based on the respective TOF thereof, based on the magnitudes of the stored samples of the charge detection signals produced by the plurality of charge amplifiers, and based on axial lengths of the drift region, each of the plurality of charge detection cylinders and spacing therebetween.

5. The mass spectrometer of claim 4, wherein the instructions stored in the at least one memory further includes instructions executable by the processor to determine the charge magnitudes or charge states of each of the at least a subset of the accelerated ions by
- (i) determining velocities of the at least a subset of the accelerated ions each based on the respective TOF thereof and the axial length of the drift region,
- (ii) for each of the at least a subset of the accelerated ions, determining a plurality of time windows based on the determined velocity of the ion and the axial lengths, each of the plurality of time windows corresponding to a time window, relative to RT or DT of the ion, during which the ion was passing through a different respective one of the plurality of charge detection cylinders,
- (iii) for each of the plurality of charge amplifiers, processing the samples of the charge detection signal produced thereby during the respective time windows for each of the at least a subset of the accelerated ions to determine a set of equations relating magnitudes of the charge detection signal to magnitudes of the at least a subset of the accelerated ions, and
- (iv) solving the plurality of sets of equations to determine charge magnitudes or charge states of each of the at least a subset of the accelerated ions.

6. The mass spectrometer of claim 4, wherein the instructions stored in the at least one memory further includes instructions executable by the processor to determine mass-to-charge ratios of the at least a subset of the accelerated ions each based on the respective TOF thereof and on the axial length of the drift region.

7. The mass spectrometer of claim 6, wherein the instructions stored in the at least one memory further includes instructions executable by the processor to determine mass values of the at least a subset of the accelerated ions each based on the respective determined mass-to-charge ratio thereof and on the respective determined charge magnitude or charge state thereof.

8. The mass spectrometer of claim 2, wherein the ion region or instrument comprises an ion acceleration region having spaced apart first and second gates, the first gate adjacent to the ion source region and the second gate adjacent to the field-free drift region, and wherein the at least one voltage source electrically connected to the first and second gates and is configured to selectively control voltage applied thereby to at least one of the first and second gates to establish the electric field within the ion acceleration region.

9. The mass spectrometer of claim 2, wherein the ion region or instrument comprises an ion trap, and wherein the at least one voltage source electrically connected to the ion trap and is configured to selectively control voltage applied thereto to establish the electric field within the ion trap.

10. The mass spectrometer of claim 2, wherein the ion region or instrument comprises a mass-to-charge ratio filter, and wherein the at least one voltage source electrically connected to the mass-to-charge ratio filter and is configured to selectively control voltage applied thereto to establish the electric field within the mass-to-charge ratio filter.

11. The mass spectrometer of claim 2, further comprising a mass-to-charge ratio filter disposed between the ion source and the ion region or instrument, wherein the ion region or instrument comprises an ion trap, and wherein the at least one voltage source is electrically connected to the mass-to-charge ratio filter and to the ion trap, the at least one voltage source configured to selectively produce at least a first voltage to configure the mass-to-charge ratio filter to pass therethrough only ions having a selected mass-to-charge ratio or having mass-to-charge ratios within a selected range of mass-to-charge ratios, and to produce at least a second voltage to selectively establish the electric field within the ion trap.

12. The mass spectrometer of claim 2, further comprising:

a first mass-to-charge ratio filter disposed between the ion source and the ion region or instrument, a dissociation stage disposed between the first mass-to-charge ratio filter and the ion region or instrument and configured to dissociate ions passing therethrough, and a second mass-to-charge ratio filter disposed between the ion source and the ion region instrument, and wherein the at least one voltage source is electrically connected to each of the first and second mass-to-charge ratio filters, the at least one voltage source configured to selectively produce at least a first voltage to configure the first mass-to-charge ratio filter to pass therethrough only ions having a first selected mass-to-charge ratio or having mass-to-charge ratios within a first selected range of mass-to-charge ratios, and to produce at least a second voltage to configure the second mass-to-charge ratio filter to pass therethrough only ions having a second selected mass-to-charge ratio or having mass-to-charge ratios within a second selected range of mass-to-charge ratios.

13. The mass spectrometer of claim 1, wherein the ion detector comprises a microchannel plate detector.

14. The mass spectrometer of claim 1, wherein the ion detector comprises an ion-to-photon detector.

15. The mass spectrometer of claim 1, wherein the ion detector comprises a Faraday cup detector.

16. The mass spectrometer of claim 1, wherein the ion detector comprises an electron multiplier detector.

17. The mass spectrometer of claim 1, further comprising:

at least one processor operatively coupled to the ion detector and to each of the plurality of charge amplifiers, and at least one memory having stored therein instructions executable by the at least one processor to cause the at least one processor to determine mass-to-charge ratios of ions drifting through the drift region based on the ion detection signals and to determine corresponding charges of the ions based on the charge detection signals produced by one or more of the plurality of charge amplifiers.

18. The mass spectrometer of claim 1, wherein the ion generator and the sample are both positioned within the ion source region.

19. The mass spectrometer of claim 1, wherein the ion generator and the sample are positioned outside of the ion source region, and wherein the ion generator is configured to generate ions from the sample and to supply the generated ions to the ion source region.

20. The mass spectrometer of claim 1, wherein the ion generator comprises an electrospray ionization source.

* * * * *